(12) United States Patent
Smith et al.

(10) Patent No.: US 11,687,345 B2
(45) Date of Patent: Jun. 27, 2023

(54) OUT-OF-ORDER BLOCK-BASED PROCESSORS AND INSTRUCTION SCHEDULERS USING READY STATE DATA INDEXED BY INSTRUCTION POSITION IDENTIFIERS

(71) Applicant: Microsoft Technology Licensing, LLC, Redmond, WA (US)

(72) Inventors: Aaron L. Smith, Seattle, WA (US); Jan S. Gray, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/224,469

(22) Filed: Jul. 29, 2016

(65) Prior Publication Data

US 2017/0315814 A1    Nov. 2, 2017

Related U.S. Application Data

(60) Provisional application No. 62/328,976, filed on Apr. 28, 2016.

(51) Int. Cl.
| | | |
|---|---|---|
| *G06F 9/38* | (2018.01) | |
| *G06F 9/30* | (2018.01) | |
| *G06F 15/78* | (2006.01) | |

(52) U.S. Cl.
CPC .......... *G06F 9/3836* (2013.01); *G06F 9/3005* (2013.01); *G06F 9/3016* (2013.01);
(Continued)

(58) Field of Classification Search
CPC .............................. G06F 9/3838; G06F 15/825
See application file for complete search history.

(56) References Cited

U.S. PATENT DOCUMENTS

| | | |
|---|---|---|
| 4,638,454 A | 1/1987 | Waterworth |
| 4,814,978 A | 3/1989 | Dennis |

(Continued)

FOREIGN PATENT DOCUMENTS

| | | |
|---|---|---|
| CN | 101133391 A | 2/2008 |
| CN | 101395573 A | 3/2009 |

(Continued)

OTHER PUBLICATIONS

Maher et al., "The Good Block: Hardware/Software Design for Composable Block-Atomic Processors", 2011, pp. 9-16.*

(Continued)

*Primary Examiner* — David J. Huisman
(74) *Attorney, Agent, or Firm* — Klarquist Sparkman, LLP

(57) ABSTRACT

Apparatus and methods are disclosed for implementing block-based processors including field programmable gate-array implementations. In one example of the disclosed technology, a block-based processor includes an instruction decoder configured to generate decoded ready dependencies for a transactional block of instructions, where each of the instructions is associated with a different instruction identifier encoded in the transactional block. The processor further includes an instruction scheduler configured to issue an instruction from a set of instructions of the transactional block of instructions. The instruction is issued based on determining that decoded ready state dependencies for an instruction are satisfied. The determining includes accessing storage with the decoded ready dependencies indexed with a respective instruction identifier that is encoded in the transactional block of instructions.

20 Claims, 13 Drawing Sheets

(52) U.S. Cl.
CPC ...... *G06F 9/30181* (2013.01); *G06F 9/30185* (2013.01); *G06F 9/3818* (2013.01); *G06F 9/3834* (2013.01); *G06F 9/3838* (2013.01); *G06F 9/3855* (2013.01); *G06F 9/3885* (2013.01); *G06F 9/3897* (2013.01); *G06F 15/7867* (2013.01)

(56) References Cited

U.S. PATENT DOCUMENTS

| | | | |
|---|---|---|---|
| 5,067,110 A | 11/1991 | Runaldue | |
| 5,185,869 A | 2/1993 | Suzuki | |
| 5,197,137 A | 3/1993 | Kumar et al. | |
| 5,212,663 A | 5/1993 | Leong | |
| 5,241,635 A | 8/1993 | Papadopoulos et al. | |
| 5,276,819 A | 1/1994 | Rau et al. | |
| 5,373,466 A | 12/1994 | Landeta et al. | |
| 5,541,850 A | 7/1996 | Vander Zanden et al. | |
| 5,546,597 A * | 8/1996 | Martell | G06F 9/3836 712/217 |
| 5,572,535 A | 11/1996 | Pixley | |
| 5,615,350 A | 3/1997 | Hesson | |
| 5,748,978 A | 5/1998 | Narayan et al. | |
| 5,781,753 A | 7/1998 | Mcfarland et al. | |
| 5,790,822 A | 8/1998 | Sheaffer et al. | |
| 5,796,997 A | 8/1998 | Lesartre et al. | |
| 5,845,103 A | 12/1998 | Sodani et al. | |
| 5,943,501 A | 8/1999 | Burger et al. | |
| 6,016,399 A | 1/2000 | Chang | |
| 6,035,374 A | 3/2000 | Panwar et al. | |
| 6,052,773 A | 4/2000 | DeHon et al. | |
| 6,061,776 A | 5/2000 | Burger et al. | |
| 6,101,597 A | 8/2000 | Colwell et al. | |
| 6,105,128 A | 8/2000 | Hathaway et al. | |
| 6,161,170 A | 12/2000 | Burger et al. | |
| 6,164,841 A | 12/2000 | Mattson et al. | |
| 6,192,447 B1 | 2/2001 | Shand | |
| 6,223,254 B1 * | 4/2001 | Soni | G06F 9/30174 711/123 |
| 6,266,768 B1 | 7/2001 | Frederick, Jr. et al. | |
| 6,282,583 B1 | 8/2001 | Pincus et al. | |
| 6,338,129 B1 | 1/2002 | Pechanek et al. | |
| 6,470,443 B1 | 10/2002 | Emer et al. | |
| 6,493,820 B2 | 12/2002 | Akkary et al. | |
| 6,529,922 B1 | 3/2003 | Hoge | |
| 6,553,480 B1 | 4/2003 | Cheong et al. | |
| 6,721,884 B1 | 4/2004 | De Oliveira Kastrup Pereira et al. | |
| 6,836,420 B1 | 12/2004 | Seshadri et al. | |
| 6,918,032 B1 | 7/2005 | Abdallah et al. | |
| 6,965,969 B2 | 11/2005 | Burger et al. | |
| 6,988,183 B1 | 1/2006 | Wong | |
| 7,032,217 B2 | 4/2006 | Wu | |
| 7,107,553 B2 | 9/2006 | Lockyear et al. | |
| 7,130,990 B2 | 10/2006 | Brekelbaum | |
| 7,188,232 B1 * | 3/2007 | Choquette | G06F 9/30043 712/218 |
| 7,299,458 B2 | 11/2007 | Hammes | |
| 7,302,527 B2 | 11/2007 | Barrick et al. | |
| 7,380,038 B2 | 5/2008 | Gray | |
| 7,676,650 B2 | 3/2010 | Ukai | |
| 7,721,066 B2 | 5/2010 | Yeh et al. | |
| 7,739,482 B2 | 6/2010 | Nguyen et al. | |
| 7,836,282 B2 | 11/2010 | Ban et al. | |
| 7,853,777 B2 | 12/2010 | Jones et al. | |
| 7,877,580 B2 | 1/2011 | Eickemeyer et al. | |
| 7,917,733 B2 | 3/2011 | Kazuma | |
| 8,006,074 B1 | 8/2011 | Miranda et al. | |
| 8,006,075 B2 | 8/2011 | Luttrell | |
| 8,032,734 B2 | 10/2011 | Svendsen et al. | |
| 8,055,881 B2 | 11/2011 | Burger et al. | |
| 8,055,885 B2 | 11/2011 | Nakashima | |
| 8,099,566 B2 | 1/2012 | Luttrell | |
| 8,127,119 B2 | 2/2012 | Burger et al. | |
| 8,180,997 B2 | 5/2012 | Burger et al. | |
| 8,201,024 B2 | 6/2012 | Burger et al. | |
| 8,250,555 B1 | 8/2012 | Lee et al. | |
| 8,321,850 B2 | 11/2012 | Bruening et al. | |
| 8,429,386 B2 | 4/2013 | Jordan et al. | |
| 8,433,885 B2 | 4/2013 | Burger et al. | |
| 8,447,911 B2 | 5/2013 | Burger et al. | |
| 8,464,002 B2 | 6/2013 | Burger et al. | |
| 8,464,029 B2 | 6/2013 | Day et al. | |
| 8,817,793 B2 | 8/2014 | Mushano | |
| 9,021,241 B2 | 4/2015 | Burger et al. | |
| 9,043,769 B2 | 5/2015 | Vorbach | |
| 9,053,292 B2 | 6/2015 | Abdallah | |
| 9,104,399 B2 | 8/2015 | Busaba et al. | |
| 9,128,725 B2 | 9/2015 | Meier et al. | |
| 9,135,015 B1 | 9/2015 | Mizrahi et al. | |
| 9,274,793 B2 | 3/2016 | Abdallah | |
| 9,690,620 B2 | 6/2017 | Mitra et al. | |
| 2001/0004756 A1 | 6/2001 | Inoue | |
| 2002/0138714 A1 | 9/2002 | Leibholz et al. | |
| 2003/0172248 A1 | 9/2003 | Streltsov | |
| 2004/0123077 A1 | 6/2004 | Shebanow et al. | |
| 2004/0128483 A1 | 7/2004 | Grochowski et al. | |
| 2005/0005084 A1 | 1/2005 | Burger et al. | |
| 2006/0112261 A1 | 5/2006 | Yourst et al. | |
| 2008/0016324 A1 * | 1/2008 | Burky | G06F 9/3838 712/217 |
| 2008/0244184 A1 | 10/2008 | Lewis et al. | |
| 2008/0244230 A1 | 10/2008 | Burger et al. | |
| 2008/0320274 A1 | 12/2008 | Singh et al. | |
| 2009/0013135 A1 | 1/2009 | Burger et al. | |
| 2009/0013160 A1 | 1/2009 | Burger et al. | |
| 2009/0113170 A1 | 4/2009 | Abdallah | |
| 2009/0150653 A1 * | 6/2009 | Monferrer | G06F 9/321 712/217 |
| 2010/0064121 A1 | 3/2010 | Alexander et al. | |
| 2010/0115237 A1 | 5/2010 | Brewer et al. | |
| 2010/0146209 A1 | 6/2010 | Burger et al. | |
| 2010/0161948 A1 | 6/2010 | Abdallah | |
| 2010/0325395 A1 | 12/2010 | Burger et al. | |
| 2011/0060889 A1 | 3/2011 | Burger et al. | |
| 2011/0072239 A1 | 3/2011 | Burger et al. | |
| 2011/0078424 A1 | 3/2011 | Boehm et al. | |
| 2012/0273593 A1 | 11/2012 | Clark et al. | |
| 2012/0303933 A1 | 11/2012 | Manet et al. | |
| 2012/0311306 A1 | 12/2012 | Mushano | |
| 2013/0007415 A1 | 1/2013 | Babayan et al. | |
| 2013/0054939 A1 | 2/2013 | Felch | |
| 2013/0159674 A1 | 6/2013 | Muff et al. | |
| 2013/0198499 A1 | 8/2013 | Dice et al. | |
| 2014/0089639 A1 | 3/2014 | Diewald et al. | |
| 2014/0181475 A1 | 6/2014 | Abdallah | |
| 2014/0181476 A1 | 6/2014 | Srinivasan et al. | |
| 2014/0281402 A1 | 9/2014 | Comparan et al. | |
| 2014/0281424 A1 | 9/2014 | Bobba | |
| 2014/0281436 A1 | 9/2014 | Abdallah | |
| 2014/0331236 A1 | 11/2014 | Mitra et al. | |
| 2014/0337581 A1 | 11/2014 | Meier | |
| 2014/0372736 A1 | 12/2014 | Greenhalgh | |
| 2015/0007188 A1 | 1/2015 | Sutanto et al. | |
| 2015/0046686 A1 | 2/2015 | Abdallah | |
| 2015/0067662 A1 | 3/2015 | Palalau | |
| 2015/0088954 A1 | 3/2015 | Bakos | |
| 2015/0100757 A1 | 4/2015 | Burger et al. | |
| 2015/0127928 A1 | 5/2015 | Burger et al. | |
| 2015/0199199 A1 | 7/2015 | Burger et al. | |
| 2015/0199272 A1 | 7/2015 | Goel et al. | |
| 2015/0277916 A1 | 10/2015 | Khartikov et al. | |
| 2015/0301831 A1 | 10/2015 | Iyer et al. | |
| 2016/0026469 A1 | 1/2016 | Lin | |
| 2016/0179532 A1 | 6/2016 | Wright | |
| 2016/0306772 A1 | 10/2016 | Burger et al. | |
| 2017/0083313 A1 | 3/2017 | Sankaralingam et al. | |
| 2017/0315812 A1 | 11/2017 | Smith et al. | |
| 2017/0315813 A1 | 11/2017 | Smith et al. | |

(56) References Cited

U.S. PATENT DOCUMENTS

| | | | |
|---|---|---|---|
| 2017/0315815 | A1 | 11/2017 | Smith et al. |
| 2018/0032344 | A1 | 2/2018 | Smith et al. |

FOREIGN PATENT DOCUMENTS

| | | | |
|---|---|---|---|
| CN | 101542430 | A | 9/2009 |
| CN | 102073478 | A | 5/2011 |
| CN | 102117197 | A | 7/2011 |
| CN | 104049941 | A | 9/2014 |
| CN | 104335183 | A | 2/2015 |
| CN | 104778030 | A | 7/2015 |
| CN | 104951281 | A | 9/2015 |
| CN | 105706050 | A | 6/2016 |
| EP | 0 410 105 | A2 | 1/1991 |
| NL | 9100598 | | 11/1992 |
| WO | WO2000/049496 | | 8/2000 |
| WO | WO2001/097054 | | 12/2001 |
| WO | WO2003/038645 | | 5/2003 |
| WO | WO2008/061154 | | 5/2008 |
| WO | 2010043401 | A2 | 4/2010 |
| WO | WO2013/081556 | | 6/2013 |
| WO | WO2014/193878 | | 12/2014 |
| WO | WO2015/069583 | | 5/2015 |

OTHER PUBLICATIONS

Firdous et al., "Comparative Analysis of LUT Design in FPGA", 2014, 3 pages.*

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger et al., "Scaling to the End of Silicon with EDGE Architectures," In Proceedings of Computer, vol. 37, Issue 7, Jul. 1, 2004, pp. 44-55.

Chang et al., "Hardware/Software Interface Design," UNU/IIST International Institute for Software Technology, Oct. 2001, 21 pages.

Cheah, et al., "iDEA: A DSP Block Based FPGA Soft Processor", In Proceedings of International Conference on Field-Programmable Technology, Dec. 10, 2012, pp. 151-158.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Duric et al., "Dynamic-Vector Execution on a General Purpose EDGE Chip Multiprocessor," In Proceedings of the 2014 International Conference on Embedded Computers Systems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

Dwiel, et al., "FPGA Modeling of Diverse Superscalar Processors", In Proceedings of the IEEE International Symposium on Performance Analysis of Systems & Software, Apr. 1, 2012, 12 pages.

Ernst, et al., "Cyclone: A Broadcast-Free Dynamic Instruction Scheduler with Selective Replay", In Proceedings of 30th Annual International Symposium on Computer Architecture, Jun. 9, 2013, 10 pages.

Fallin, et al., "The Heterogeneous Block Architecture", In Proceedings of the IEEE 32nd International Conference on Computer Design, Oct. 19, 2014, pp. 386-393.

Fisher, "Trace Scheduling: A Technique for Global Microcode Compaction," IEEE Transactions on Computer, vol. C-30, No. 7, Jul. 1981, 13 pages.

Gebhart et al., "An Evaluation of the TRIPS Computer System," In Proceedings of the 14th international conference on Architectural support for programming languages and operating systems, Mar. 7, 2009, 12 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gray, Jan, "Building a RISC System in an FPGA", In Circuit Cellar Magazine, Mar. 2000, pp. 1-25.

Gray, "GRVI Phalanx: A Massively Parallel RISC-V FPGA Accelerator Accelerator," 24th IEEE Symposium on Field-Programmable Custom Computing Machines (FCCM 2016), May 1, 2016, 4 pages.

Gray and Smith, "Towards an Area-Efficient Implementation of a High ILP Edge Soft Processor: Comparing Out-of-Order Dataflow Instruction Scheduler Designs," poster temporarily on display during The 22nd IEEE International Symposium on Field-Programmable Custom Computing Machines May 11-13, 2014, Boston, Massachusetts (poster on display for approximately 1-2 hours, and less than one day, May 2014).

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Ipek et al., "Core Fusion: Accommodating Software Diversity in Chip Multiprocessors", In Proceedings of the 34th annual international symposium on Computer architecture, Jun. 9, 2007, 12 pages.

Jain et al., "DeCO: A DSP Block Based FPGA Accelerator Overlay with Low Overhead Interconnect," 24th IEEE Symposium on Field-Programmable Custom Computing Machines (FCCM 2016), May 1, 2016, 8 pages.

Jones, et al., "An FPGA-based VLIW Processor with Custom Hardware Execution", In Proceedings of the ACM/SIGDA 13th international symposium on Field-programmable gate arrays, Feb. 20, 2005, pp. 107-117.

Jourdan, et al., "Exploring Configurations of Functional Units in an Out-of-Order Superscalar Processor", In Proceedings of the 22nd annual international symposium on Computer architecture, Jul. 1995, pp. 117-125.

Kiefer, et al., "ParaNut—An Open, Scalable, and Highly Parallel Processor Architecture for FPGA-based Systems", In Proceedings of Embedded World Conference, Feb. 2015, 7 pages.

Kim, et al., "Composable Lightweight Processors", In Proceedings of the 40th Annual IEEE/ACM International Symposium on Microarchitecture, Dec. 1, 2007, p. 381-394.

Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).

Maher et al., "Merging Head and Tail Duplication for Convergent Hyperblock Formation," In Annual IEEE/ACM International Symposium on Microarchitecture, Dec. 2006, 12 pages.

McDonald et al., "Characterization of TCC on Chip-Multiprocessors," Parallel Architectures and Compilation Techniques, 2005. PACT 2005. 14th International Conference on. IEEE, 2005, 12 pages.

Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).

(56) References Cited

OTHER PUBLICATIONS

Melvin et al., "Enhancing Instruction Scheduling with a Block-Structured ISA," International Journal of Parallel Programming, vol. 23, No. 3, Jun. 1995, 23 pages.

Microsoft Research, "E2," document downloaded on Apr. 10, 2015 from http://research.microsoft.com/en-us/projects/e2/.

Munshi, et al., "A Parameterizable SIMD Stream Processor", In Proceedings of Canadian Conference on Electrical and Computer Engineering, May 1, 2005, pp. 806-811.

Nagarajan et al., "Critical Path Analysis of the TRIPS Architecture," In IEEE International Symposium on Performance Analysis of Systems and Software, Mar. 19, 2006, 11 pages.

Nagarajan et al., "A Design Space Evaluation of Grid Processor Architectures," In Proceedings of the 34th annual ACM/IEEE international symposium on Microarchitecture, Dec. 1, 2001, pp. 40-51.

Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.

Ovtcharov, et al., "TILT: A Multithreaded VLIW Soft Processor Family", In Proceedings of 23rd International Conference on Field programmable Logic and Applications, Sep. 2, 2013, 4 pages.

Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.

Patterson et al., "Computer Architecture: A Quantitative Approach," Morgan Kaufmann Publishers, Inc., 1990, pp. 146-161.

Pengfei et al., "M5 Based EDGE Architecture Modeling", In Proceedings of IEEE International Conference on Computer Design, Oct. 3, 2010, pp. 289-296.

Pierce et al., "Wrong-Path Instruction Prefetching", In Proceedings of the 29th Annual IEEE/ACM International Symposium on Microarchitecture, Dec. 2, 1996, pp. 1-17.

Putnam, et al., "Dynamic Vectorization in the E2 Dynamic Multicore Architecture", In Proceedings of ACM SIGARCH Computer Architecture News, vol. 38, No. 4, Sep. 2010, pp. 27-32.

Requa et al., "The Piecewise Data Flow Architecture: Architectural Concepts," IEEE Transactions on Computers, vol. C-32, No. 5, May 1983, 14 pages.

Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.

Robatmili, et al., "How to implement effective prediction and forwarding for fusable dynamic multicore architectures", In Proceedings of 19th IEEE International Symposium on High Performance Computer Architecture, Feb. 2013, 12 pages.

Roesner, "Counting Dependence Predictors," In Undergraduate Honors Thesis, May 2, 2008, 25 pages.

Rosière, et al., "An Out-of-Order Superscalar Processor on FPGA: The ReOrder Buffer Design", In Proceedings of the Conference on Design, Automation and Test in Europe, Mar. 12, 2012, 6 pages.

Samala, et al., "Methodology to Derive Resource Aware Context Adaptable Architectures for FPGAs", In Proceedings of IET Computers & Digital Techniques, vol. 4, Issue 1, Jan. 2010, pp. 1-15.

Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).

Sankaralingam, et al., "Exploiting ILP, TLP, and DLP with the Polymorphous TRIPS Architecture", In Proceedings of the 30th annual international symposium on Computer architecture, Jun. 9, 2013, 12 pages.

Sethumadhavan et al., "Design and Implementation of the TRIPS Primary Memory System," In Proceedings of International Conference on Computer Design, Oct. 1, 2006, 7 pages.

Sethumadhavan, et al., "Late-Binding: Enabling Unordered Load-Store Queues", In Proceedings of the 34th annual international symposium on Computer architecture, Jun. 9, 2007, 11 pages.

Sibi et al., "Scaling Power and Performance via Processor Composability," University of Texas at Austin technical report No. TR-10-14 (2010), 20 pages.

Smith, et al., "Compiling for EDGE Architectures", In Proceedings of International Symposium on Code Generation and Optimization, Mar. 26, 2006, 11 pages.

Smith et al., "Dataflow Predication", In Proceedings of 39th Annual IEEE/ACM International Symposium on Microarchitecture, Dec. 9, 2006, 12 pages.

Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.

Sohi et al., "Multiscalar Processors," In Proceedings of 22nd Annual International Symposium on Computer Architecture, Jun. 22-24, 1995, 12 pages.

Sohi, "Retrospective: multiscalar processors," In Proceedings of The 25th Annual International Symposium on Computer Architectures, Jun. 27-Jul. 1, 1998, pp. 111-1114.

Subramaniam, et al., "Fire-and-Forget: Load/Store Scheduling with No Store Queue at All", In Proceedings of 39th Annual IEEE/ACM International Symposium on Microarchitecture, Dec. 2006, 12 pages.

Tamches et al., "Dynamic Kernel Code Optimization," In Workshop on Binary Translation, 2001, 10 pages.

Tan, et al., "Mapping-Aware Constrained Scheduling for LUT-Based FPGAs", In Proceedings of the ACM/SIGDA International Symposium on Field-Programmable Gate Arrays, Feb. 22, 2015, pp. 190-199.

Vander Zanden, "Synthesis of Memories From Behavioral HDLs," Proceedings of 7th Annual IEEE International ASIC Conference and Exhibit, Sep. 19-23, 1994, pp. 71-74.

Vucha, et al., "A Novel Methodology for task Distribution in Heterogeneous Reconfigurable Computing System", In International Journal of Embedded systems and Applications, vol. 5, Issue 1, Mar. 2015, pp. 19-39.

Wawrzynek, et al., "Rethinking FPGA Computing with a Many-Core Approach", In Proceedings of Workshop on Computer Architecture and Reconfigurable Logic, Dec. 5, 2010, pp. 1-6.

Wong, et al., "Efficient Methods for Out-of-Order Load/Store Execution for High-Performance Soft Processors", In Proceedings of International Conference on Field-Programmable Technology, Dec. 9, 2013, pp. 442-445.

Wong et al., "'High Performance Instruction Scheduling Circuits for Out-of-Order Soft Processors,'" 24th IEEE Symposium on Field-Programmable Custom Computing Machines (FCCM 2016), May 1, 2016, 8 pages.

Wu et al., "Block Based Fetch Engine for Superscalar Processors", In Proceedings of the 15th International Conference on Computer Applications in Industry and Engineering, Nov. 7, 2002, 4 pages.

Yiannacouras, et al., "VESPA: Portable, Scalable, and Flexible FPGA-based Vector Processors", In Proceedings of the international conference on Compilers, architectures and synthesis for embedded systems, Oct. 19, 2008, pp. 61-70.

Yu, et al., "Vector Processing as a Soft-core CPU Accelerator", In Proceedings of the 16th international ACM/SIGDA symposium on Field programmable gate arrays, Feb. 24, 2008, pp. 222-232.

Zmily, et al., "Improving Instruction Delivery with a Block-Aware ISA", In Proceedings of 11th International Euro-Par Conference on Parallel Processing, Aug. 30, 2005, pp. 530-539.

Duric et al., "Imposing Coarse-Grained Reconfiguration to General Purpose Processors," 2015 International Conference on Embedded Computer Systems: Architectures Modeling, and Simulation (SAMOS XV), Jul. 19, 2015, pp. 42-51.

International Search Report and Written Opinion for PCT/US2017/029224, dated Jul. 24, 2017, pp. 1-19.

Pricopi et al., "Bahurupi: A Polymorphic Heterogeneous Multi-Core Architecture," ACM Transactions on Architecture and Code Optimization, vol. 8, No. 4, Jan. 2012, pp. 1-21.

(56) References Cited

OTHER PUBLICATIONS

Robatmili et al., "Strategies for mapping dataflow blocks to distributed hardware," 41st IEEE International Symposium on Microarchitecture, Nov. 2008, pp. 23-34.
"Non Final Office Action Issued in U.S. Appl. No. 15/224,473", dated Sep. 7, 2018, 14 Pages.
Johri, Abhishek, "Implementation of Instruction Scheduler on FPGA", In Master's Thesis, 48-096435, Mar. 24, 2011, 57 Pages.
"Final Office Action Issued in U.S. Appl. No. 10/829,668", dated Oct. 30, 2007, 9 Pages.
"Final Office Action Issued in U.S. Appl. No. 10/829,668", dated Aug. 26, 2008, 18 Pages.
"Final Office Action Issued in U.S. Appl. No. 10/829,668", dated Oct. 13, 2009, 25 Pages.
"Final Office Action Issued in U.S. Appl. No. 10/829,668", dated Jul. 23, 2010, 27 Pages.
"Non-Final Office Action Issued in U.S. Appl. No. 10/829,668", dated Mar. 9, 2010, 29 Pages.
"Non-Final Office Action Issued In U.S. Appl. No. 10/829,668", dated Mar. 24, 2009, 21 Pages.
"Non-Final Office Action Issued in U.S. Appl. No. 10/829,668", dated May 24, 2007, 16 Pages.
"Final Office Action Issued in U.S. Appl. No. 12/136,645", dated Apr. 6, 2010, 19 Pages.
"Non-Final Office Action Issued in U.S. Appl. No. 12/136,645", dated Mar. 16, 2011, 19 Pages.
"Non-Final Office Action Issued in U.S. Appl. No. 12/136,645", dated Sep. 17, 2009, 20 Pages.
"Non-Final Office Action Issued in U.S. Appl. No. 15/224,471", dated May 11, 2018, 12 Pages.
"Non-Final Office Action Issued in U.S. Appl. No. 15/224,592", dated Apr. 5, 2018, 9 Pages.
"Non-Final Office Action Issued in U.S. Appl. No. 15/224,624", dated May 2, 2018, 13 Pages.
"NIOS Embedded Processor Software Development Reference Manual", In Publication of Altera Corporation—Version1.1, Mar. 2001, 72 Pages, including pp. 1-7.
Burger, et al., "Design and Implementation of the TRIPS EDGE Architecture", In Proceedings of the 32nd Annual International Symposium on Computer Architecture, Jun. 4, 2005, 41 Pages, including slides 119-131, 197-216.
Cheah, et al., "The iDEA DSP Block-Based Soft Processor for FPGAs", In Journal of ACM Transactions on Reconfigurable Technology and Systems (TRETS), vol. 7, Issue 3, Aug. 1, 2014, pp. 1-23.
Chung, et al., "PROTOFLEX: Towards Scalable, Full-System Multiprocessor Simulations Using FPGAs", In Journal of ACM Transactions on ReconfigurableTechnology and Systems, vol. 2, Issue 2, Jun. 2009, 32 Pages, including pp. 5-22.
Govindan, Madhu Sarava, "E3:Energy-Efficient EDGE Architectures", In Dissertation Presented to the Faculty of Graduate School of the university of Texas in Partial Fulfillment of the Requirements for the Degree of doctor of Philosophy, Aug. 2010, 244 Pages including pp. 14-28.
Gray, Jan, "Homebrewing RISCs in FPGAs", Retrieved From: http://www.fpgacpu.org/papers/j32.pdf, Retrieved on May 16, 2016, 26 Pages, including pp. 1-26.
Gray, Jan, "The Past and Future of FPGA Soft Processors", In Proceedings of International Conference on ReConFigurable Computing and FPGAs, Dec. 9, 2014, pp. 1-63, including pp. 22-33, 50-53.
Huang, et al., "Compiler-Assisted Sub-Block Reuse", In UMSI Research Report, vol. 73, May 2000, 21 Pages.
Huang, Jian, "Improving Processor Performance Through Compiler-Assisted Block Reuse", In Dissertation Submitted in Partial Fulfillment of the Requirements for the Degree of Doctor of Philosophy, May 2000, 125 Pages, including pp. 1-40 and 71-74.
Kavi, et al., "Concurrency, Synchronization, Speculation—The Dataflow Way", In Journal of Advances in Computers, vol. 96, Nov. 23, 2013, 41 Pages, including pp. 16-37.
Keckler, et al., "Tera-Op Reliable Intelligently Adaptive Processing System (TRIPS)", In AFRL-IF-WP-TR-2004-1514 (Stinfo Final Report), Apr. 2004, 29 Pages, including pp. 3-11.
Kozumplik, et al., "TRIPS to the Semantic EDGE", Retrieved From: https://web.archive.org/web/20150921054006/http://vbn.aau.dk/ws/files/61072300/1212050422.pdf, Sep. 22, 2015, 28 Pages, including pp. 1-14.
Laforest, Charles Eric, "High-Speed Soft-Processor Architecture for FPGA Overlays", In Doctoral dissertation, University of Toronto, Jun. 2015, 253 Pages, including pp. 7-32 and 40-47.
Liu, Haiming, "Hardware Techniques to Improve Cache Efficiency", In Dissertation Presented at the Faculty of The Graduate School of the University of Texas at Austin, May 2009, 189 Pages, including pp. 112-123.
Maher, Bertrand Allen., "Atomic Block Formation for Explicit Data Graph Execution Architectures", In Dissertation Presented to the Faculty of the Graduate School of The University of Texas at Austin in Partial Fulfillment of the Requirements for the Degree of Doctor of Philosophy, Aug. 2010, 185 Pages, including 11-20, and 34-50.
McDonald, et al., "TRIPS Processor Reference Manual, Department of Computer Sciences", In Technical Report TR-05-19, Mar. 10, 2005, 194 Pages, including pp. 13-29, 75-80, and 94-96.
"International Preliminary Report on Patentability Issued in PCT Application No. PCT/US2002/034965", dated Feb. 11, 2004, 5 Pages.
"International Search Report Issued in PCT Application No. PCT/US2002/034965", dated Dec. 29, 2003, 4 Pages.
"International Search Report and Written Opinion Issued in PCT Application No. PCT/US2017/029225", dated Sep. 19, 2017, 16 Pages.
"International Search Report and Written Opinion Issued in PCT Application No. PCT/US2017/029226", dated Jul. 18, 2017, 14 Pages.
"International Search Report and Written Opinion Issued in PCT Application No. PCT/US2017/029227", dated Jul. 24, 2017, 17 Pages.
"international Search Report and Written Opinion Issued in PCT Application No. PCT/US2017/042970", dated Oct. 10, 2017, 16 Pages.
Rusten, et al., "Implementing a Heterogeneous Multi-Core Prototype in an FPGA", In Master's Thesis of Norwegian University of Science and Technology, Jul. 2012, 128 Pages, including pp. 16-18 and 45-52.
Sankaralingam, Karthikeyan, "Polymorphous Architectures: A Unified Approach for Extracting Concurrency of Different Granularities", In Dissertation Presented to the Faculty of the Graduate School of The University of Texas at Austin, Aug. 2007, 276 Pages, including pp. 34-78.
Sankaralingam, et al., "TRIPS: A Polymorphous Architecture for Exploiting ILP, TLP and DLP", In Proceedings of ACM Transactions on Architecture and Code Optimization, vol. 1, Issue No. 1, Mar. 1, 2004, 32 Pages, including pp. 62-74.
Smith, Aaron Lee, "Explicit Data Graph Compilation", Dissertation Presented to the Faculty of the Graduate School of The University of Texas at Austin in Partial Fulfillment of the Requirements for the Degree of Doctor of Philosophy, Dec. 2009, 201 Pages, including pp. 89-113.
Souza, et al., "Dynamically Scheduling VLIW Instructions", In Journal of Parallel and Distributed Computing, vol. 60, Jul. 2000, pp. 1480-1511, including pp. 1480-1499.
Vander Zanden, "MILO: A Microarchitecture and Logic Optimizer", In Proceedings of 25th ACM Design Automation Conference, Jun. 12, 1988, pp. 403-408.
Wohl, et al., "Using Verilog Simulation Libraries for ATPG", In Proceedings of International Test Conference, Sep. 28-30, 1999, pp. 1011-1020.
Xilinx, "MicroBlaze Processor Reference Guide", Retrieved from https://www.xilinx.com/support/documentation/sw_manuals/mb_ref_guide.pdf, Retrieved on May 16, 2016, 256 Pages, including pp. 9-12 and 255.
Zmily, et al., "Block-Aware Instruction Set Architecture", In Proceedings of ACM Transactions on Architecture and Code Optimization, vol. 3, Issue 3, Sep. 2006, 31 Pages, including pp. 327-340.

(56) References Cited

OTHER PUBLICATIONS

"Explicit Data Graph Execution", Retrieved on: Aug. 6, 2015, document last modified Mar. 23, 2014, Available at https://en.wikipedia.org/wiki/Explicit_Data_Graph_Execution.

Zmily, "Block-Aware Instruction Set Architecture", In Doctoral Dissertation, Jun. 2007, 176 pages, including pp. 7-41.

"Final Office Action Issued in U.S. Appl. No. 15/224,471", dated Mar. 5, 2019, 17 Pages.

"Final Office Action Issued in U.S. Appl. No. 15/224,592", dated Jan. 17, 2019, 11 Pages.

"Final Office Action Issued in U.S. Appl. No. 15/224,624", dated Mar. 5, 2019, 17 Pages.

Final Office Action Issued in U.S. Appl. No. 15/224,473, dated May 3, 2019, 14 Pages.

"Non Final Office Action Issued in U.S. Appl. No. 15/224,473", dated Dec. 11, 2019, 17 Pages.

"Non Final Office Action Issued in U.S. Appl. No. 15/224,624", dated Oct. 30, 2019, 16 Pages.

"Non-Final Office Action Issued in U.S. Appl. No. 15/224,592", dated Sep. 13, 2019, 12 Pages.

"Non-Final Office Action Issued in U.S. Appl. No. 15/224,471", dated Sep. 17, 2019, 17 Pages.

"Office Action Issued in European Application No. 17721016.8", dated Jul. 2, 2020, 8 Pages.

"Office Action Issued in European Application No. 17721017.6", dated Jul. 7, 2020, 9 Pages.

"Office Action Issued in European Application No. 17733162.6", dated Jul. 14, 2020, 5 Pages.

"Final Office Action Issued in U.S. Appl. No. 15/224,473", dated Jul. 6, 2020, 12 Pages.

"Final Office Action Issued in U.S. Appl. No. 15/224,624", dated Jul. 28, 2020, 12 Pages.

"Notice of Allowance Issued in European Patent Application No. 17721016.8", dated Jul. 28, 2022, 2 Pages.

"Office Action Issued in Chinese Patent Application No. 201780026331.4", dated Oct. 8, 2022, 23 Pages.

"First Office Action and Search Report Issued in Chinese Patent Application No. 201780026337.1", dated Aug. 25, 2022, 28 Pages.

"First Office Action and Search Report Issued in Chinese Patent Application No. 201780026354.5", dated Sep. 2, 2022, 24 Pages.

"Non Final Office Action Issued in U.S. Appl. No. 15/224,624", dated Aug. 17, 2021, 13 Pages.

"Notice of Allowance Issued in U.S. Appl. No. 15/224,624", dated May 16, 2022, 5 Pages.

"Notice of Allowance Issued in European Patent Application No. 17721016.8", dated May 3, 2022, 7 Pages.

"Office Action Issued in European Patent Application No. 17721016.8", dated Mar. 30, 2021, 8 Pages.

"Notice of Allowance issued in Chinese Patent Application No. 201780026331.4", dated Feb. 27, 2023, 4 Pages.

"Second Office Action Issued in China Patent Application No. 201780026354.5", dated Feb. 14, 2023, 7 Pages.

"Notice of Allowance Issued in Chinese Patent Application No. 201780026337.1", dated Feb. 19, 2023, 4 Pages.

* cited by examiner

OUT-OF-ORDER BLOCK-BASED PROCESSORS AND INSTRUCTION SCHEDULERS USING READY STATE DATA INDEXED BY INSTRUCTION POSITION IDENTIFIERS

CROSS-REFERENCE TO RELATED APPLICATIONS

This application claims the benefit of U.S. Provisional Patent Application No. 62/328,976, entitled "OUT-OF-ORDER BLOCK-BASED PROCESSORS AND INSTRUCTION SCHEDULERS," filed Apr. 28, 2016, which is incorporated herein by reference in its entirety.

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based processor architectures (BB-ISAs), including explicit data graph execution (EDGE) architectures. The described techniques and tools for solutions for, e.g., improving processor performance and/or reducing energy consumption can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, handheld devices, handheld computers, personal digital assistants (PDAs), touch screen tablet devices, tablet computers, wearable computers, and laptop computers.

Soft processor implementations of block-based processor architectures can improve design productivity. For example, descriptions of a block-based soft-processor written in a suitable description language (e.g., C, SystemC, SystemVerilog, or Verilog) can undergo logic synthesized to generate a gate-level netlist mapped to an FPGA. A bitstream is generated for the FPGA that is used to program the FPGA. A costly initial port of software into hardware instead becomes a simple cross-compile targeting the soft processors, and most design turns are quick recompiles. Application bottlenecks can then be offloaded to custom hardware exposed as new instructions, function units, autonomous accelerators, memories, or interconnects.

Certain examples of the disclosed technology allow for the configuration of high instruction level parallelism (ILP), out-of-order (OoO) superscalar soft processors without reduced complexity and overhead. In some examples, an Explicit Data Graph Execution (EDGE) instruction set architecture is provided for area and energy efficient high ILP execution. Together the EDGE architecture and its compiler finesse away much of the register renaming, CAMs, and complexity, enabling an out-of-order processor for only a few hundred FPGA lookup tables ("LUTs") more than an in-order scalar RISC.

This disclosed technology introduces an EDGE ISA and explores how EDGE microarchitectures compare to in-order RISCs. Methods and apparatus are disclosed for building small, fast dataflow instruction schedulers in FPGAs.

DETAILED DESCRIPTION

I. General Considerations

Figure 1:
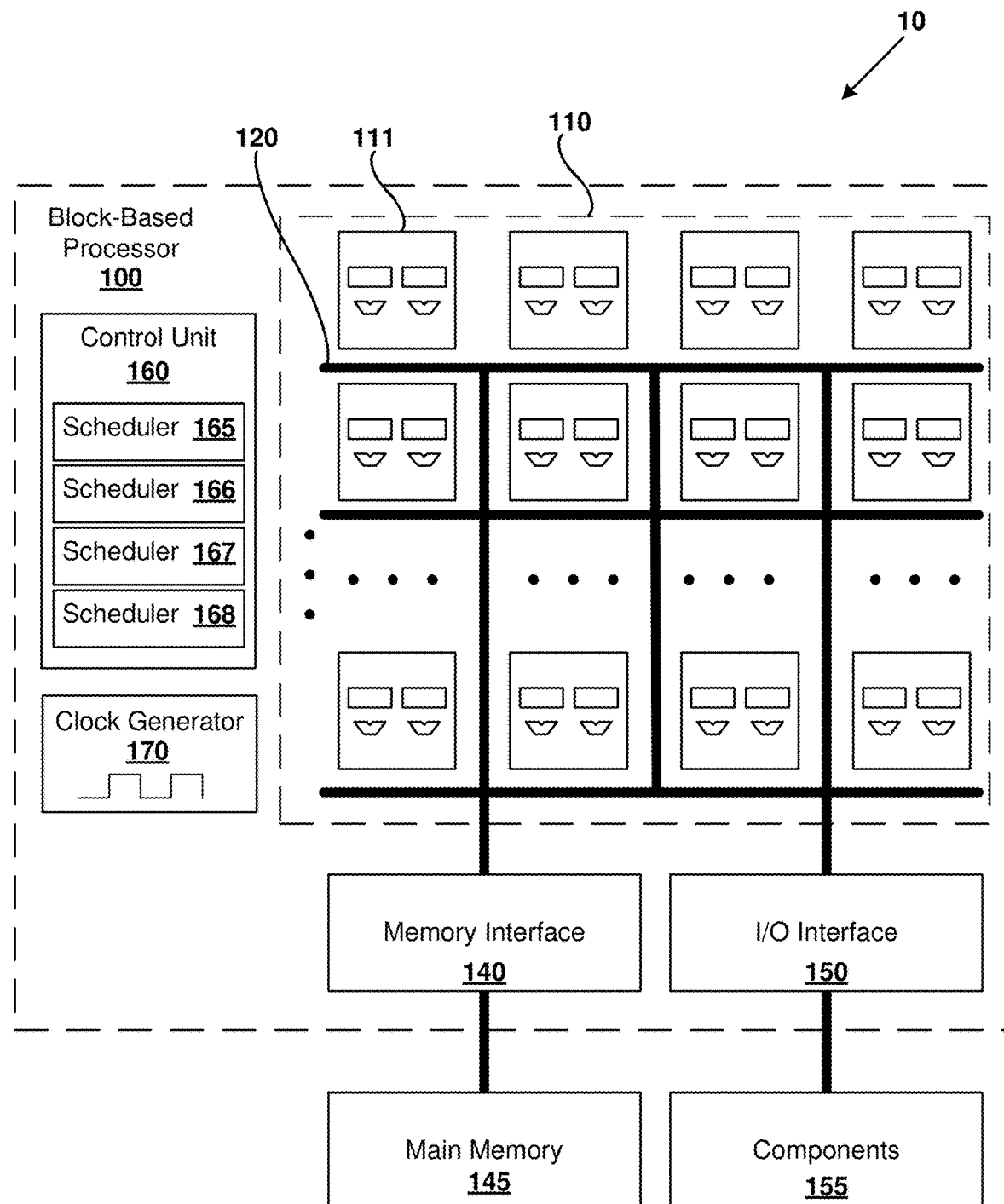
FIG. 1 illustrates an example block-based processor including multiple processor cores as can be employed according to some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of one or more processing cores 110, including a processor core 111. The block-based processor can be implemented in as a custom or application-specific integrated circuit (e.g., including a system-on-chip (SoC) integrated circuit), as a field programmable gate array (FPGA) or other reconfigurable logic, or as a soft processor virtual machine hosted by a physical general purpose processor.

As shown in FIG. 1, the processor cores are connected to each other via core interconnect 120. The core interconnect 120 carries data and control signals between individual ones of the cores 110, a memory interface 140, and an input/output (I/O) interface 150. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to memory 145, for example, memory located on another integrated circuit besides the processor 100 (e.g., the memory can be static RAM (SRAM) or dynamic RAM (DRAM)), or memory embedded on the same integrated circuit as the processor (e.g., embedded SRAM or DRAM (eDRAM)). The memory interface 140 and/or the main memory can include caches (e.g., n-way or associative caches) to improve memory access performance In some examples the cache is implemented using static RAM (SRAM) and the main memory 145 is implemented using dynamic RAM (DRAM). In some examples the memory interface 140 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 manages allocation of virtual memory, expanding the available main memory 145. In some examples, support for bypassing cache structures or for ensuring cache coherency when performing memory synchronization operations (e.g., handling contention issues or shared memory between plural different threads, processes, or processors) are provided by the memory interface 140 and/or respective cache structures.

The I/O interface 150 includes circuitry for receiving and sending input and output signals to other components 155, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140. In some examples the I/O signal implementation is not limited to full swing electrical digital signals, but the I/O interface 150 can be configured to provide differential signals, pulsed signals, or other suitable signals for transmitting data and control signals.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 150, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example a program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory, a hard macro processor block provided in an FPGA, or a general purpose soft processor). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a number of schedulers 165-168 that are used to control instruction pipelines of the processor cores 110. In other examples, schedulers can be arranged so that they are contained with each individual processor core. As used herein, scheduler block allocation refers to directing operation of an instruction blocks, including initiating instruction block mapping, fetching, decoding, execution, committing, aborting, idling, and refreshing an instruction block. Further, instruction scheduling refers to scheduling the issuance and execution of instructions within an instruction block. For example, based on instruction dependencies and data indicating a relative ordering for memory access instructions, the control unit 160 can determine which instruction(s) in an instruction block are ready to issue and initiate issuance and execution of the instructions. Processor cores 110 are assigned to instruction blocks during instruction block mapping. The recited stages of instruction operation are for illustrative purposes and in some examples of the disclosed technology, certain operations can be combined, omitted, separated into multiple operations, or additional operations added. Each of the schedulers 165-168 schedules the flow of instructions, including allocation and de-allocation of cores for performing instruction processing, control of input data and output data between any of the cores, register files, the memory interface 140, and/or the I/O interface 150.

The block-based processor 100 also includes a clock generator 170, which distributes one or more clock signals to various components within the processor (e.g., the cores 110, interconnect 120, memory interface 140, and I/O interface 150). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Microarchitecture

Figure 2:
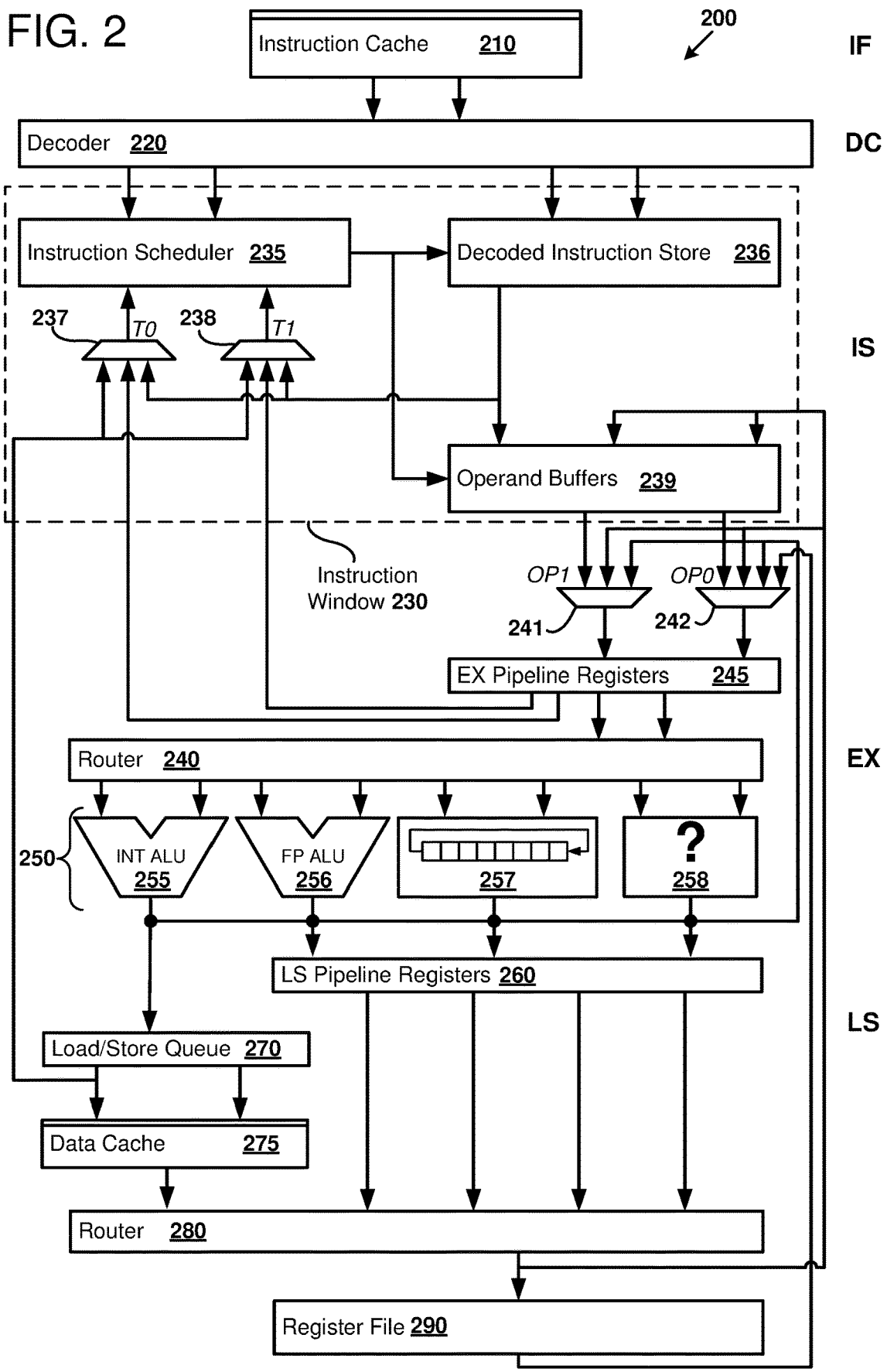
FIG. 2 illustrates an example microarchitecture for implementing a block-based processor as can be used in certain examples of the disclosed technology.

FIG. 2 is a block diagram further detailing an example microarchitecture 200 for implementing the block-based processor 100, and in particular, an instance of one of the block-based processor cores, as can be used in certain examples of the disclosed technology. For ease of explanation, the exemplary microarchitecture has five pipeline stages including: instruction fetch (IF), decode (DC), issue, including operand fetch (IS), execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core includes an instruction cache 210 that is coupled to an instruction decoder 220. The instruction cache 210 is configured to receive block-based processor instructions from a memory. In some FPGA implementations, the instruction cache can be implemented by a dual read port, dual write port, 18 or 36 Kb (kilobit), 32 bit wide block RAM. In some examples, the physical block RAM is configured to operate as two or more smaller block RAMs.

The processor core further includes an instruction window 230, which includes an instruction scheduler 235, a decoded instruction store 236, and a plurality of operand buffers 239. In FPGA implementations, each of these instruction window components 230 can be implemented including the use of LUT RAM (e.g., with SRAM configured as lookup tables) or BRAM (block RAM). The instruction scheduler 235 can send an instruction identifier (instruction ID or IID) for an instruction to the decoded instruction store 236 and the operand buffers 239 as a control signal. As discussed further below, each instruction in an instruction block has an associated instruction identifier that uniquely identifies the instruction within the instruction block. In some examples, instruction targets for sending the result of executing an instruction are encoded in the instruction. In this way, dependencies between instructions can be tracked using the instruction identifier instead of monitoring register dependencies. In some examples, the processor core can include two or more instruction windows. In some examples, the processor core can include one instruction window with multiple block contexts.

As will be discussed further below, the microarchitecture 200 includes a register file 290 that stores data for registers defined in the block-based processor architecture, and can have one or more read ports and one or more write ports. Because an instruction block executes on a transactional basis, changes to register values made by an instance of an instruction block are not visible to the same instance; the register writes will be committed upon completing execution of the instruction block.

The decoded instruction store 236 stores decoded signals for controlling operation of hardware components in the processor pipeline. For example, a 32-bit instruction may be decoded into 128-bits of decoded instruction data. The decoded instruction data is generated by the decoder 220 after an instruction is fetched. The operand buffers 239 store operands (e.g., register values received from the register file, data received from memory, immediate operands coded within an instruction, operands calculated by an earlier-issued instruction, or other operand values) until their respective decoded instructions are ready to execute. Instruction operands and predicates for the execute phase of the pipeline are read from the operand buffers 239, respectively, not (directly, at least) from the register file 290. The instruction window 230 can include a buffer for predicates directed to an instruction, including wired-OR logic for combining predicates sent to an instruction by multiple instructions.

In some examples, all of the instruction operands, except for register read operations, are read from the operand buffers 239 instead of the register file. In some examples the values are maintained until the instruction issues and the operand is communicated to the execution pipeline. In some FPGA examples, the decoded instruction store 236 and operand buffers 239 are implemented with a plurality of LUT RAMs.

The instruction scheduler 235 maintains a record of ready state of each decoded instruction's dependencies (e.g., the instruction's predicate and data operands). When all of the instruction's dependencies (if any) are satisfied, the instruction wakes up and is ready to issue. In some examples, the lowest numbered ready instruction ID is selected each pipeline clock cycle and its decoded instruction data and input operands are read. Besides the data mux and function unit control signals, the decoded instruction data can encode up to two ready events in the illustrated example. The instruction scheduler 235 accepts these and/or events from other sources (selected for input to the scheduler on inputs T0 and T1 with multiplexers 237 and 238, respectively) and updates the ready state of other instructions in the window. Thus dataflow execution proceeds, starting with the instruction block's ready zero-input instructions, then instructions that these instructions target, and so forth. Some instructions are ready to issue immediately (e.g., move immediate instructions) as they have no dependencies. Depending on the ISA, control structures, and other factors, the decoded instruction store 236 is about 100 bits wide in some examples, and includes information on instruction dependencies, including data indicating which target instruction(s)'s active ready state will be set as a result of issuing the instruction.

As used herein, ready state refers to processor state that indicates, for a given instruction, whether and which of its operands (if any) are ready, and whether the instruction itself is now ready for issue. In some examples, ready state includes decoded ready state and active ready state. Decoded ready state data is initialized by decoding instruction(s). Active ready state represents the set of input operands of an instruction that have been evaluated so far during the execution of the current instance of an instruction block. A respective instruction's active ready state is set by executing instruction(s) which target, for example, the left, right, and/or predicate operands of the respective instruction.

Attributes of the instruction window 230 and instruction scheduler 235, such as area, clock period, and capabilities can have significant impact to the realized performance of an EDGE core and the throughput of an EDGE multiprocessor. In some examples, the front end (IF, DC) portions of the microarchitecture can run decoupled from the back end portions of the microarchitecture (IS, EX, LS). In some FPGA implementations, the instruction window 230 is configured to fetch and decode two instructions per clock into the instruction window.

The instruction scheduler 235 has diverse functionality and requirements. It can be highly concurrent. Each clock cycle, the instruction decoder 220 writes decoded ready state and decoded instruction data for one or more instructions into the instruction window 230. Each clock cycle, the instruction scheduler 235 selects the next instruction(s) to issue, and in response the back end sends ready events, for example, target ready events targeting a specific instruction's input slot (e.g., predicate slot, right operand (OP0), or left operand (OP1)), or broadcast ready events targeting all instructions waiting on a broadcast ID. These events cause per-instruction active ready state bits to be set that, together with the decoded ready state, can be used to signal that the corresponding instruction is ready to issue. The instruction scheduler 235 sometimes accepts events for target instructions which have not yet been decoded, and the scheduler can also can also inhibit reissue of issued ready instructions.

Control circuits (e.g., signals generated using the decoded instruction store 236) in the instruction window 230 are used to generate control signals to regulate core operation (including, e.g., control of datapath and multiplexer select signals) and schedule the flow of instructions within the core. This can include generating and using memory access instruction encodings, allocation and de-allocation of cores for performing instruction processing, control of input data and output data between any of the cores 110, register files, the memory interface 140, and/or the I/O interface 150.

In some examples, the instruction scheduler 235 is implemented as a finite state machine coupled to other instruction window logic. In some examples, the instruction scheduler is mapped to one or more banks of RAM in an FPGA, and can be implemented with block RAM, LUT RAM, or other reconfigurable RAM. As will be readily apparent to one of ordinary skill in the relevant art, other circuit structures, implemented in an integrated circuit, programmable logic, or other suitable logic can be used to implement hardware for the instruction scheduler 235. In some examples of the disclosed technology, front-end pipeline stages IF and DC can run decoupled from the back-end pipelines stages (IS, EX, LS).

In the example of FIG. 2, the operand buffers 239 send the data operands, which can be designated left operand (LOP) and right operand (ROP) for convenience, to a set of execution state pipeline registers 245 via one or more switches (e.g., multiplexers 241 and 242). These operands can also be referred to as OP1 and OP0, respectively. A first router 240 is used to send data from the operand buffers 239 to one or more of the functional units 250, which can include but are not limited to, integer ALUs (arithmetic logic units) (e.g., integer ALUs 255), floating point units (e.g., floating point ALU 256), shift/rotate logic (e.g., barrel shifter 257), or other suitable execution units, which can including graphics functions, physics functions, and other mathematical operations. In some examples, a programmable execution unit 258 can be reconfigured to implement a number of different arbitrary functions (e.g., a priori or at runtime).

Data from the functional units 250 can then be routed through a second router (not shown) to a set of load/store pipeline registers 260, to a load/store queue 270 (e.g., for performing memory load and memory store operations), or fed back to the execution pipeline registers, thereby bypassing the operand buffers 239. The load/store queue 270 is coupled to a data cache 275 that caches data for memory operations. The outputs of the data cache 275, and the load/store pipelines registers 260 can be sent to a third router 280, which in turn sends data to the register file 290, the operand buffers 239, and/or the execution pipeline registers 245, according to the instruction being executed in the pipeline stage.

When execution of an instruction block is complete, the instruction block is designated as "committed" and signals from the control outputs can in turn can be used by other cores within the block-based processor 100 and/or by the control unit 160 to initiate scheduling, fetching, and execution of other instruction blocks. As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window and control unit of the processor cores 110. The area, clock period, capabilities, and limitations substantially determine the realized performance of the individual cores 110 and the throughput of the block-based processor 100.

Updates to the visible architectural state of the processor (such as to the register file 290 and the memory) affected by the executed instructions can be buffered locally within the core until the instructions are committed. The control circuitry can determine when instructions are ready to be committed, sequence the commit logic, and issue a commit signal. For example, a commit phase for an instruction block can begin when all register writes are buffered, all writes to memory (including unconditional and conditional stores) are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control circuit also controls, at least in part, allocation of functional units to the instructions window.

Because the instruction block is committed (or aborted) as an atomic transactional unit, it should be noted that results of certain operations are not available to instructions within an instruction block. This is in contrast to RISC and CISC architectures that provide results visible on an individual, instruction-by-instruction basis. Thus, additional techniques are disclosed for supporting memory synchronization and other memory operations in a block-based processor environment.

In some examples, block-based instructions can be non-predicated, or predicated true or false. A predicated instruction does not become ready until it is targeted by another instruction's predicate result, and that result matches the predicate condition. If the instruction's predicate does not match, then the instruction never issues.

In some examples, upon branching to a new instruction block, all instruction window ready state (stored in the instruction scheduler 235) is flash cleared (block reset). However when a block branches back to itself (block refresh), only active ready state is cleared; the decoded ready state is preserved so that it is not necessary to re-fetch and decode the blocks instructions. Thus, refresh can be used to save time and energy in loops, instead of performing a block reset.

Since some software critical paths include a single chain of dependent instructions (for example, instruction A targets instruction B, which in turn targets instruction C), it is often desirable that the dataflow scheduler not add pipeline bubbles for successive back-to-back instruction wakeup. In such cases, the IS-stage ready-issue-target-ready pipeline recurrence should complete in one cycle, assuming that this does not severely affect clock frequency.

Instructions such as ADD have a latency of one cycle. With EX-stage result forwarding, the scheduler can wake their targets' instructions in the IS-stage, even before the instruction completes. Other instruction results may await ALU comparisons, take multiple cycles, or have unknown latency. These instructions wait until later to wake their targets.

Finally, the scheduler design can be scalable across a spectrum of EDGE ISAs. In some examples, each pipeline cycle can accept from one to four decoded instructions and from two to four target ready events, and issue one to two instructions per cycle.

A number of different technologies can be used to implement the instruction scheduler 235. For example, the scheduler 235 can be implemented as a parallel scheduler, where instructions' ready state is explicitly represented in FPGA D-type flip-flops (FFs), and in which the ready status of every instruction is reevaluated each cycle. In other examples, the instruction scheduler 235 can be implemented as a more compact incremental scheduler that keeps ready state in LUT RAM and which updates ready status of about two to four target instructions per cycle.

The register file 290 may include two or more write ports for storing data in the register file, as well as having a plurality of read ports for reading data from individual registers within the register file. In some examples, a single instruction window (e.g., instruction window 230) can access only one port of the register file at a time, while in other examples, the instruction window 230 can access one read port and one write port, or can access two or more read ports and/or write ports simultaneously. In some examples, the microarchitecture is configured such that not all the read ports of the register 290 can use the bypass mechanism. For the example microarchitecture 200 shown in FIG. 2, the register file can send register data on the bypass path to one of the multiplexers 242 for the operand OP0, but not operand OP1. Thus, for multiple register reads in one cycle, only one operand can use the bypass, while the other register read results are sent to the operand buffers 239, which inserts an extra clock cycle in the instruction pipeline.

In some examples, the register file 290 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 290 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, the register file 290 is implemented as an array of flip-flops, while in other examples, the register file can be implemented using latches, SRAM, or other forms of memory storage. The ISA specification for a given processor specifies how registers within the register file 290 are defined and used.

V. Example Field Programmable Gate Array Architecture

Figure 3:
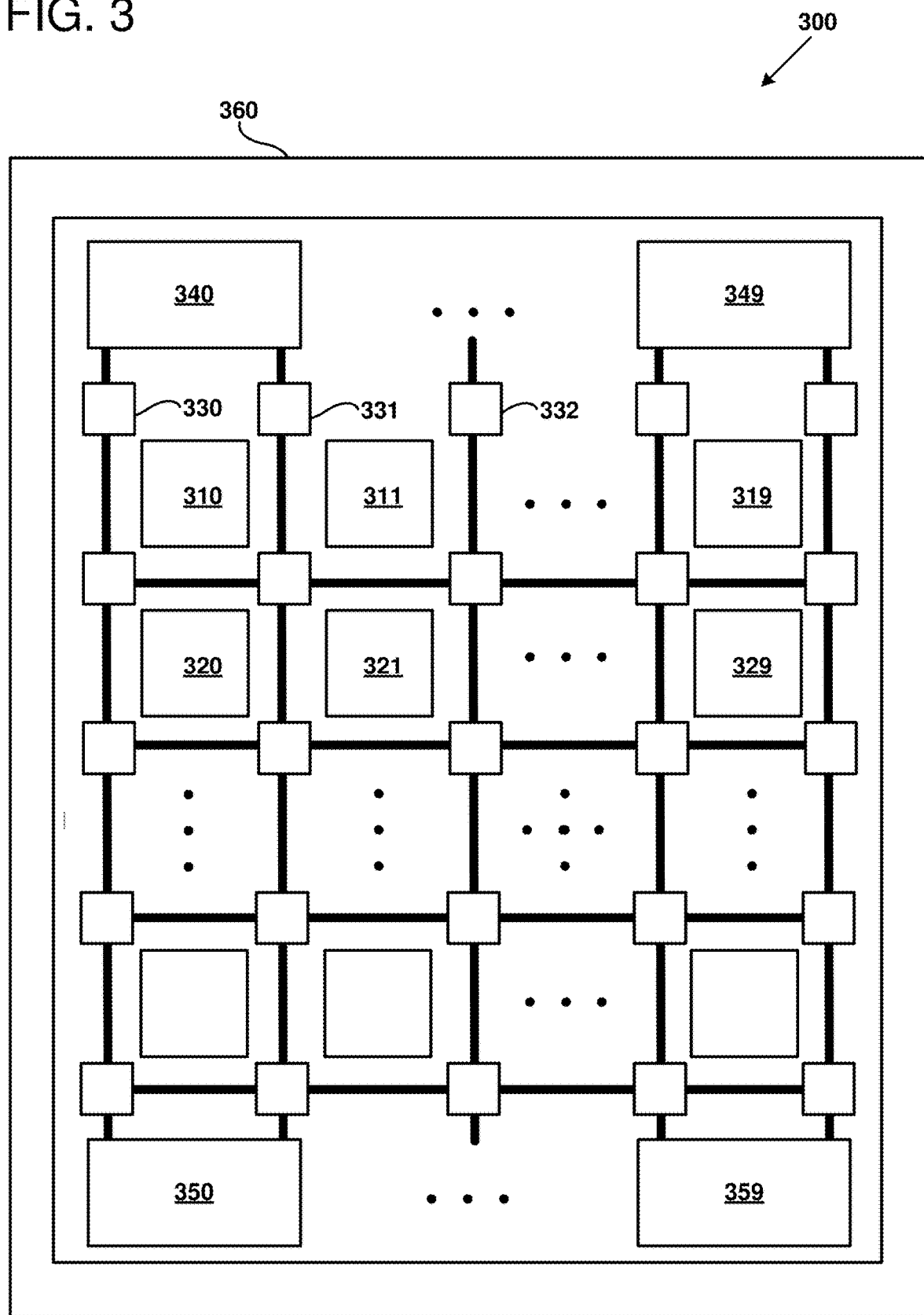
FIG. 3 is a block diagram outlining an example FPGA microarchitecture as can be used in some examples of the disclosed technology.

FIG. 3 is a block diagram 300 that depicts an example field programmable gate array (FPGA) architecture that is configured to implement certain examples of the disclosed technology. For example, the block-based processor 100 discussed above regarding FIG. 1, including those examples that used the microarchitecture 200 depicted in FIG. 2 can be mapped to the FPGA architecture of FIG. 3.

The FPGA includes an array of reconfigurable logic blocks arranged in an array. For example, the FPGA includes a first row of logic blocks, including logic blocks 310, 311, and 319, and a second row of logic blocks including logic blocks 320, 321, and 329. Each of the logic blocks includes logic that can be reconfigured to implement arbitrary logic functions and can also include sequential logic elements such as latches, flip-flops, and memories. The logic blocks are interconnected to each other using a routing fabric that includes a number of interconnect switches that can also be programmable. For example, there is a first row of switch blocks 330, 331, 332, etc., positioned between the first row of reconfigurable logic blocks and the second row of reconfigurable logic blocks. The switches can be configured in order to change wire connections that carry signals between the reconfigurable logic blocks. For example, instructions schedulers, functional units, pipeline buffers, and operand buffers can be mapped to the logic blocks connected using the switch blocks of FIG. 3.

The FPGA also includes a number of more complex components. For example, the logic block includes a number of block RAMs, for example, block RAM 340 and block RAM 349. The block RAMs typically contain a larger number of memory bits, for example, a few thousand memory bits that are accessed by applying an address to the memory, and reading from one or more read ports. In some examples, the block RAMs can include two or more write ports and two or more read ports. In other examples, the block RAMs may only have a single read and/or a single write port. While the block RAMs are typically accessed by applying an address and reading corresponding data, in some examples, the block RAMs can be configured with additional circuitry that allows for implementation of more complex functions including shift registers and First-In First-Out (FIFO) buffers.

The illustrated FPGA also includes a number of hard macro blocks including hard macro block 350 and hard macro block 359. These macro blocks can include more complex functionality such as processor functionality, digital signal processing functionality, accelerators, or other functions deemed to be desirable. The FPGA is further surrounded by an I/O ring 360 that can be coupled to the logic blocks, the block rams, and/or the hard macro blocks in order to receive and send signals to components away from the FPGA. In some examples, the I/O signals are full rail voltage signals, while other examples, differential signals are used. In some examples, the I/O ports can be multiplexed (e.g. time-multiplexed) in order to support input and output of more signals than the number of pins available on the FPGA.

While many examples of FPGAs are typically reconfigurable an arbitrary number of times through the use of electrically erasable memories, in other examples, one-time programmable logic elements can be used. For example, the logic blocks and switches can be programmed with the use of fuses, anti-fuses, or with a ROM mask to program a logic function once that is not easily reversible.

In the reconfigurable case, the FPGA typically has a configuration port that receives data according to a file dubbed a bitstream, or a configuration bitstream. The bitstream data is read into the device and used to program and configure the logic blocks, the switches, the block rams, and/or the hard macros. When a new design is desired, the configuration can be erased and a new design configured into the device. In some examples, the FPGA can be partially reconfigured in order to save on programming time. For example, a subset of the logic blocks, the switches, or block rams can be dynamically reconfigured in the field without reprogramming the entire device.

One challenge for block-based processor implementations mapped onto reconfigurable logic is determining microarchitectural structures that can be efficiently implemented using the available blocks of a custom or off-the-shelf device. However, using the disclosed technologies, higher performance, and/or more efficient structures can be implemented. Further, it should be readily understood that while some examples of the FPGAs are a stand-alone integrated circuit, in other examples, the FPGA may be packaged differently, for example, in a multi-chip module (MCM), or on the same circuit die as a custom or basic system-on-chip (SoC).

Figure 4:
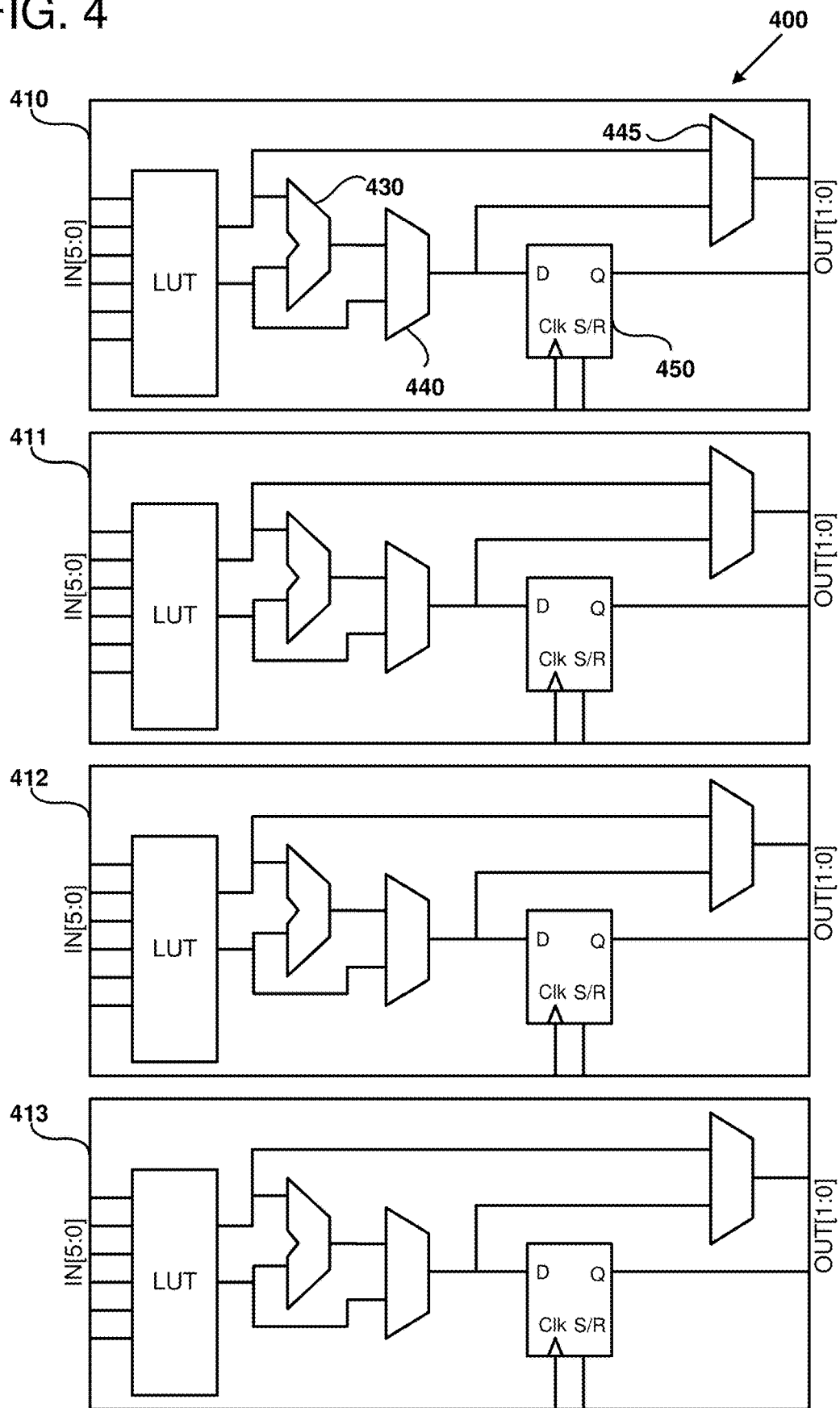
FIG. 4 illustrates example reconfigurable logic in a reconfigurable logic block as can be used in certain examples of the disclosed technology.

FIG. 4 is a block diagram 400 illustrating four reconfigurable logic blocks 410, 411, 412, and 413 that can configured to form part of the logic fabric of an example FPGA-integrated circuit. The components inside the reconfigurable logic blocks shown are identical, or homogenous, but it should be readily understood, in other examples, more than one type of reconfigurable logic block may be present on a single FPGA.

A first reconfigurable logic block 410 includes a six-input Look Up Table (LUT) 420 that is coupled to carry logic 430, a number of multiplexers 440 and 445, and a storage element (here, a D flip-flop) 450. The LUT 420 can be implemented using a small memory (for example, a memory having six address bits and two output bits as shown). Thus, any six-input Boolean function can be implemented by using a single LUT. In some examples, outputs of LUTs can be combined, or a reconfigurable logic block can have multiple LUTs that can be connected together in order to perform more complex logic functions. In some examples, common logic functions can be providing in addition to the LUT. For example, the carry logic 430 can be configured to perform the carry propagation logic for an adder. The multiplexers are used to select various output from other components. For example, the multiplexer 440 can be used to select the output of either the LUT 420 or the carry logic 430, while the multiplexer 445 can be used to select another output of the LUT 420 or the multiplexer 440. In some examples, the multiplexer is used to either select a sequential output of a state element (e.g. flip-flop 450), or a combinational output of a Look Up Table. It should be readily understood to one of ordinary skill in the art that different logic functions, LUT sizes, and sequential elements can be employed in a reconfigurable logic element. Thus, techniques for mapping block-based processors to such reconfigurable logic can vary depending on the specific target FPGA architecture. The configuration of the logic inside the reconfigurable logic block can be programmed using the configuration port of the FPGA. In some examples, the LUTs are not programmed once, but can be configured to act as small memories that store certain data used in the block-based processor.

In some examples of the disclosed technology, a logic synthesis tool (logic compiler) is used to transform a specification for a block-processor into a configuration bitstream that can be applied to a configuration port of an FPGA to configure logic to implement a block-based processor. In some examples, the designer can use an RPM (relationally placed macro) methodology to improve area and interconnect delays and achieve a repeatable layout for easy routing and timing closure under module composition and massive replication. For example, by including structural RTL instantiating modules and tiling them into a scheduler, logic for the instruction scheduler can be locked to a set of single LUTs, allow for a compact clustering and placement of logic within the FPGA.

VI. Example Stream of Instruction Blocks

Figure 5:
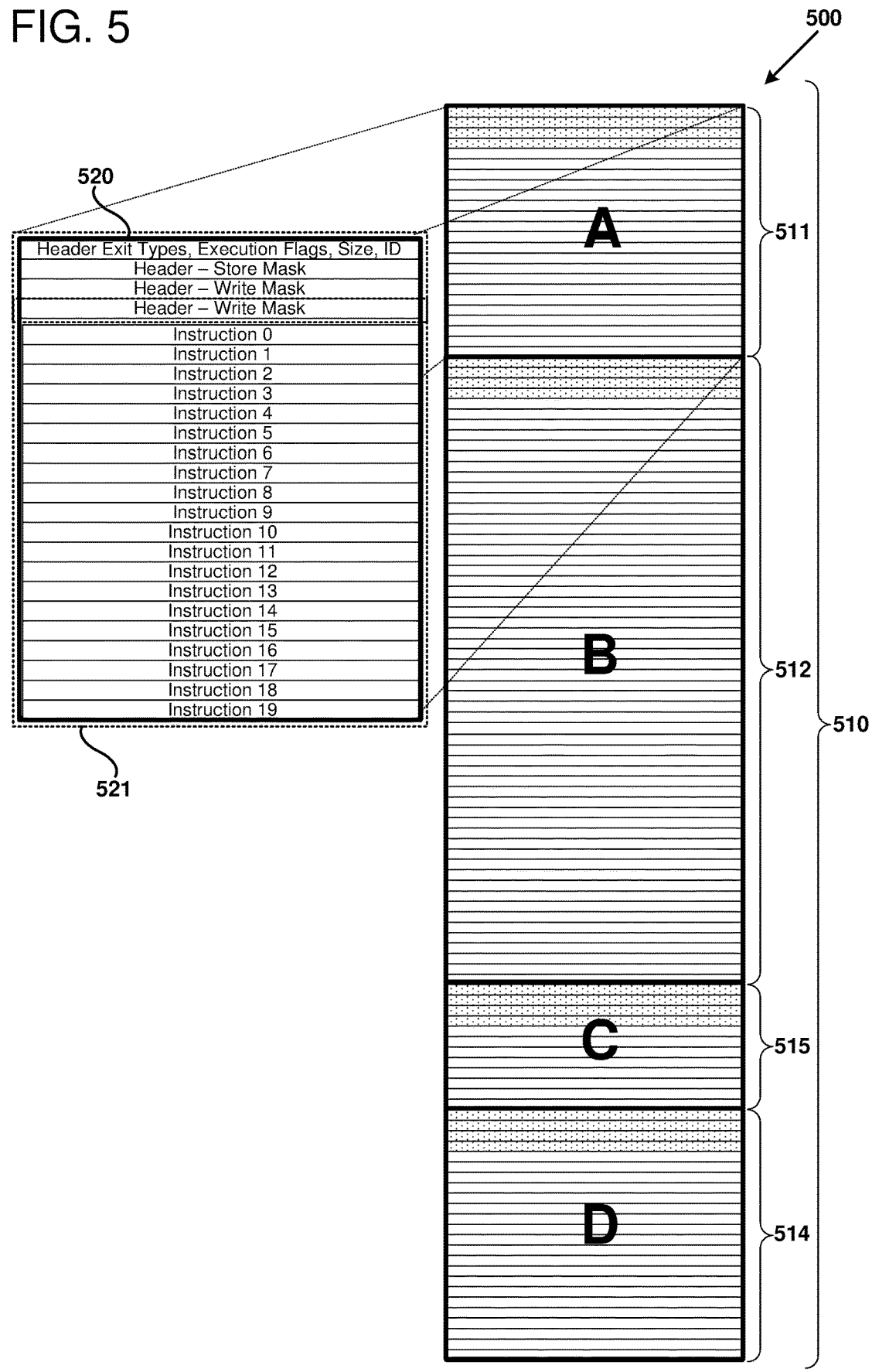
FIG. 5 illustrates example block-based processor headers and instructions as can be used in some examples of the disclosed technology.

Turning now to the diagram 500 of FIG. 5, a portion 510 of a stream of block-based instructions, including a number of variable length instruction blocks 511-514 is illustrated. The stream of instructions can be used to implement user application, system services, or any other suitable use. The stream of instructions can be stored in memory, received from another process in memory, received over a network connection, or stored or received in any other suitable manner In the example shown in FIG. 5, each instruction block begins with an instruction header, which is followed by a varying number of instructions. For example, the instruction block 511 includes a header 520 and twenty instructions 521. The particular instruction header 520 illustrated includes a number of data fields that control, in part, execution of the instructions within the instruction block, and also allow for improved performance enhancement techniques including, for example branch prediction, speculative execution, lazy evaluation, and/or other techniques. The instruction header 520 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 520 can also include one or more execution flags that indicate one or more modes of operation for executing the instruction block. For example, the modes of operation can include core fusion operation, vector mode operation, memory dependence prediction, and/or in-order or deterministic instruction execution. Further, the execution flags can include a block synchronization flag that inhibits speculative execution of the instruction block.

In some examples of the disclosed technology, the instruction header 520 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 520 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 520 also includes a store mask that indicates which of the load-store queue identifiers encoded in the block instructions are assigned to store operations. The instruction block header can also include a write mask, which identifies which global register(s) the associated instruction block will write. In some examples, the store mask is stored in a store vector register by, for example, an instruction decoder (e.g., decoder 220). In other examples, the instruction block header 520 does not include the store mask, but the store mask is generated dynamically by the instruction decoder by analyzing instruction dependencies when the instruction block is decoded. For example, the decoder can generate load store identifiers for instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder) and stored in a write mask register. The write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 521 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative. Because an instruction's dependencies are encoded in the instruction block (e.g., in the instruction block header, other instructions that target the instruction, and/or in the instruction itself), instructions can issue and execute out of program order when the instruction's dependencies are satisfied.

VII. Example Block Instruction Target Encoding

Figure 6:
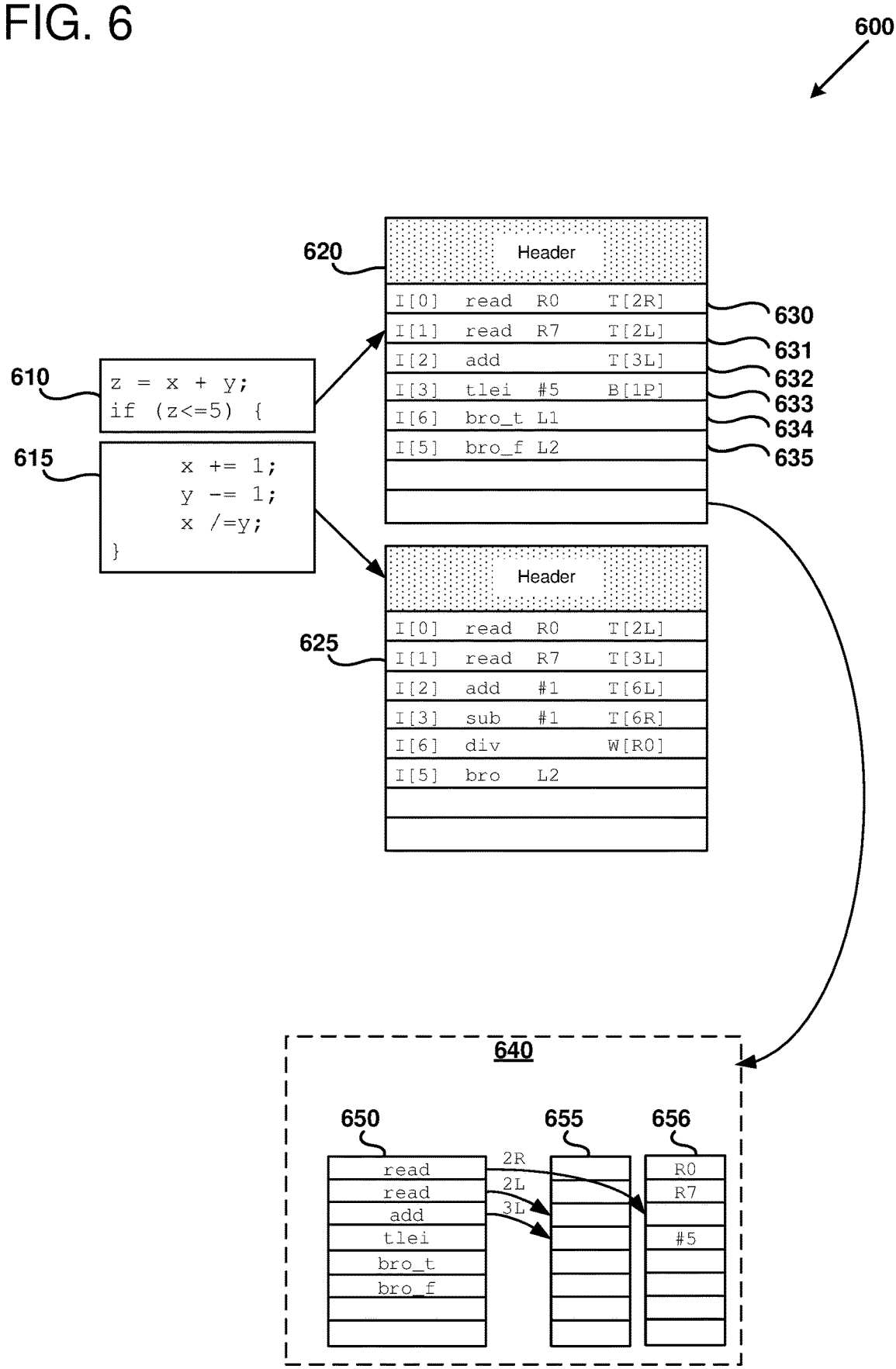
FIG. 6 illustrates an example source code portion and corresponding instruction blocks as can be used in certain examples of the disclosed technology.

FIG. 6 is a diagram 600 depicting an example of two portions 610 and 615 of C language source code and their respective instruction blocks 620 and 625, illustrating how block-based instructions can explicitly encode their targets. In this example, the first two READ instructions 630 and 631 target the right (T[2R]) and left (T[2L]) operands, respectively, of the ADD instruction 632 (2R indicates targeting the right operand of instruction number 2; 2L indicates the left operand of instruction number 2). In the illustrated ISA, the read instruction is the only instruction that reads from the global register file (e.g., register file 290); however any instruction can target the global register file. When the ADD instruction 632 receives the results of both register reads it will become ready and execute. It is noted that the present disclosure sometimes refers to the right operand as OP0 and the left operand as OP1.

When the TLEI (test-less-than-equal-immediate) instruction 633 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 634 and BRO_F 635). The branch instruction that receives a matching predicate will issue, but the other instruction, encoded with the complementary predicated, will not issue.

A dependence graph 640 for the instruction block 620 is also illustrated, as an array 650 of instruction nodes and their corresponding operand targets 655 and 656. This illustrates the correspondence between the block instructions 620, the corresponding instruction window entries, and the underlying dataflow graph represented by the instructions. Here decoded instructions READ 630 and READ 631 are ready to issue, as they have no input dependencies. As they issue and execute, the values read from registers R0 and R7 are written into the right and left operand buffers of ADD 632, marking the left and right operands of ADD 632 "ready." As a result, the ADD 632 instruction becomes ready, issues to an ALU, executes, and the sum is written to the left operand of the TLEI instruction 633.

VIII. Example Block-Based Instruction Formats

Figure 7:
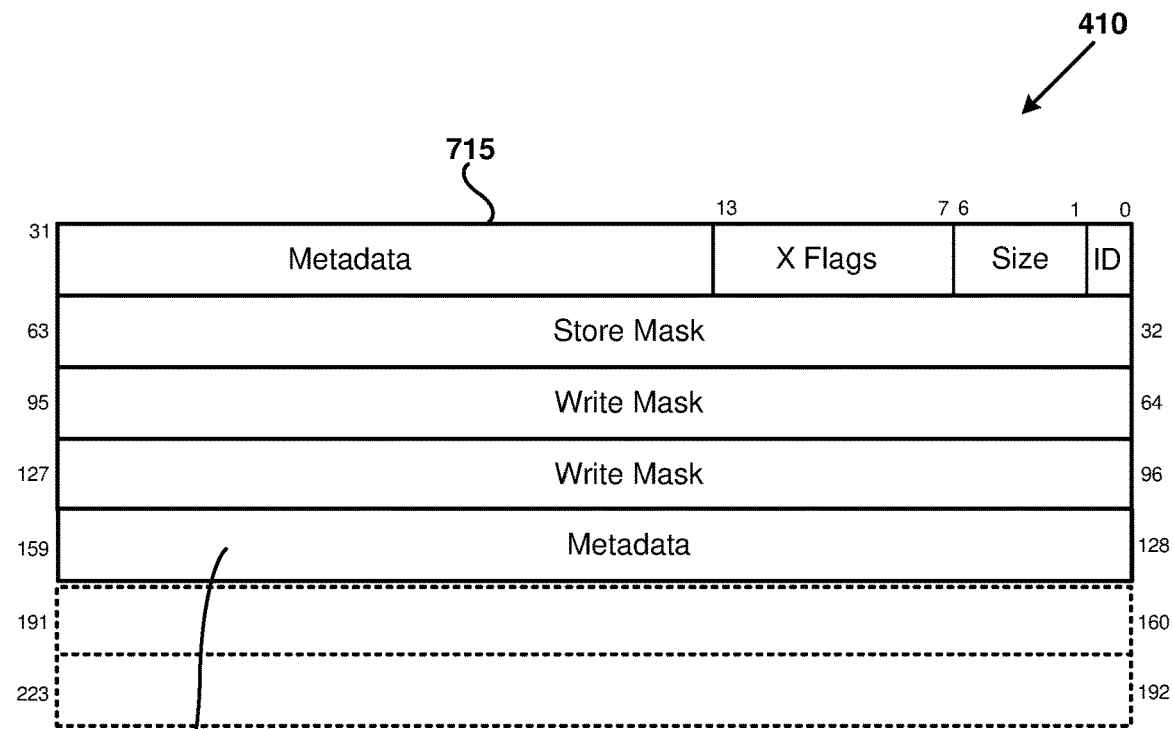
FIG. 7 illustrates an example of instruction formats that can be used for certain examples of block-based processors according to the disclosed technology.
Figure 7:
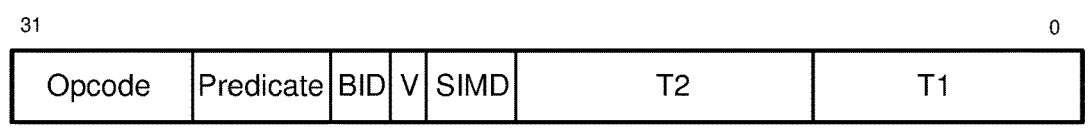
Figure 7:
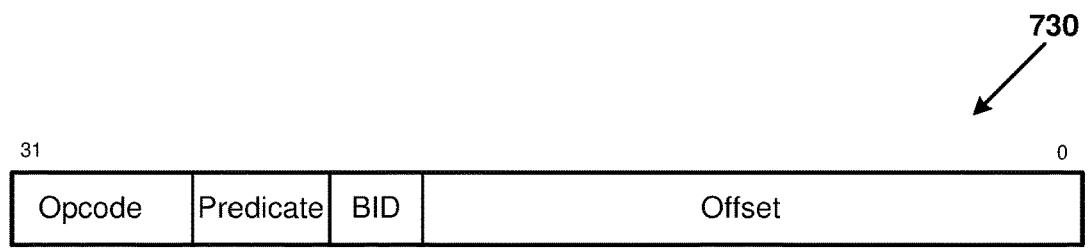
Figure 7:
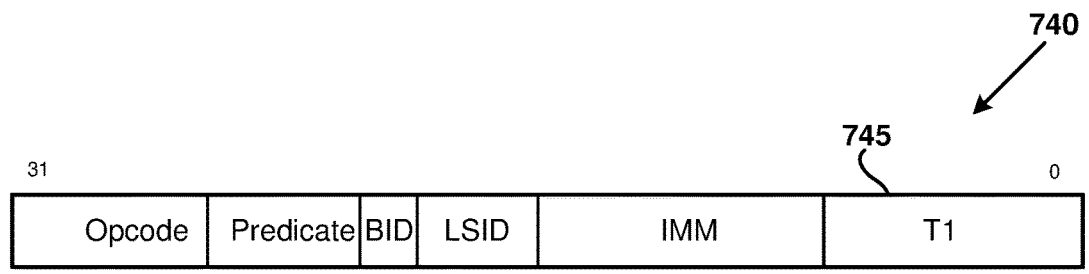

FIG. 7 is a diagram illustrating generalized examples of instruction formats for an instruction header 710, a generic instruction 720, a branch instruction 730, and a memory access instruction 740 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 710 includes four 32-bit words and is labeled from its least significant bit (lsb) (bit 0) up to its most significant bit (msb) (bit 127). As shown, the instruction header includes a write mask field, a number of execution flag fields, an instruction block size field, and an instruction header ID bit (the least significant bit of the instruction header). In some examples, the instruction header 710 includes additional metadata 715 and/or 716, which can be used to control additional aspects of instruction block execution and performance.

The execution flag fields depicted in FIG. 7 occupy bits 6 through 13 of the instruction block header 710 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution. The block synchronization flag occupies bit 9 of the instruction block and inhibits speculative execution of the instruction block when set to logic 1. Inhibiting speculative execution is highly desirable for example, when shared memory operations such as store conditional instructions or other share memory operations are performed by an instruction block to prevent memory hazards in violation of the ISA specification.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions.

The illustrated generic block instruction 720 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 720 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 720, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specify the instructions to which the results of the block-based instruction are sent. For example, an ADD instruction at instruction slot 7 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 730 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 720 and the branch instruction 730 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 740 format includes an opcode field, a predicate field, a broadcast ID field (BID), an immediate field (IMM), and a target field (T1). The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field can be used as an offset for the operand sent to the load or store instruction. The operand plus (shifted) immediate offset is used as a memory address for the load/store instruction (e.g., an address to read data from, or store data to, in memory). For some instructions, such as a store conditional instruction, the target field T1 745 is used to specify where a status indicator generated by executing will be stored. For example, the target field T1 745 can specify a register to store a status indicator value that indicates whether the store conditional instruction executed successfully or not (e.g., based on the load link address and link values). A subsequent instruction block can check the status indicator value and take appropriate action (e.g., by flushing an instruction block, causing the instruction block to re-execute, raising an exception, etc.).

IX. Example Processor State Diagram

Figure 8:
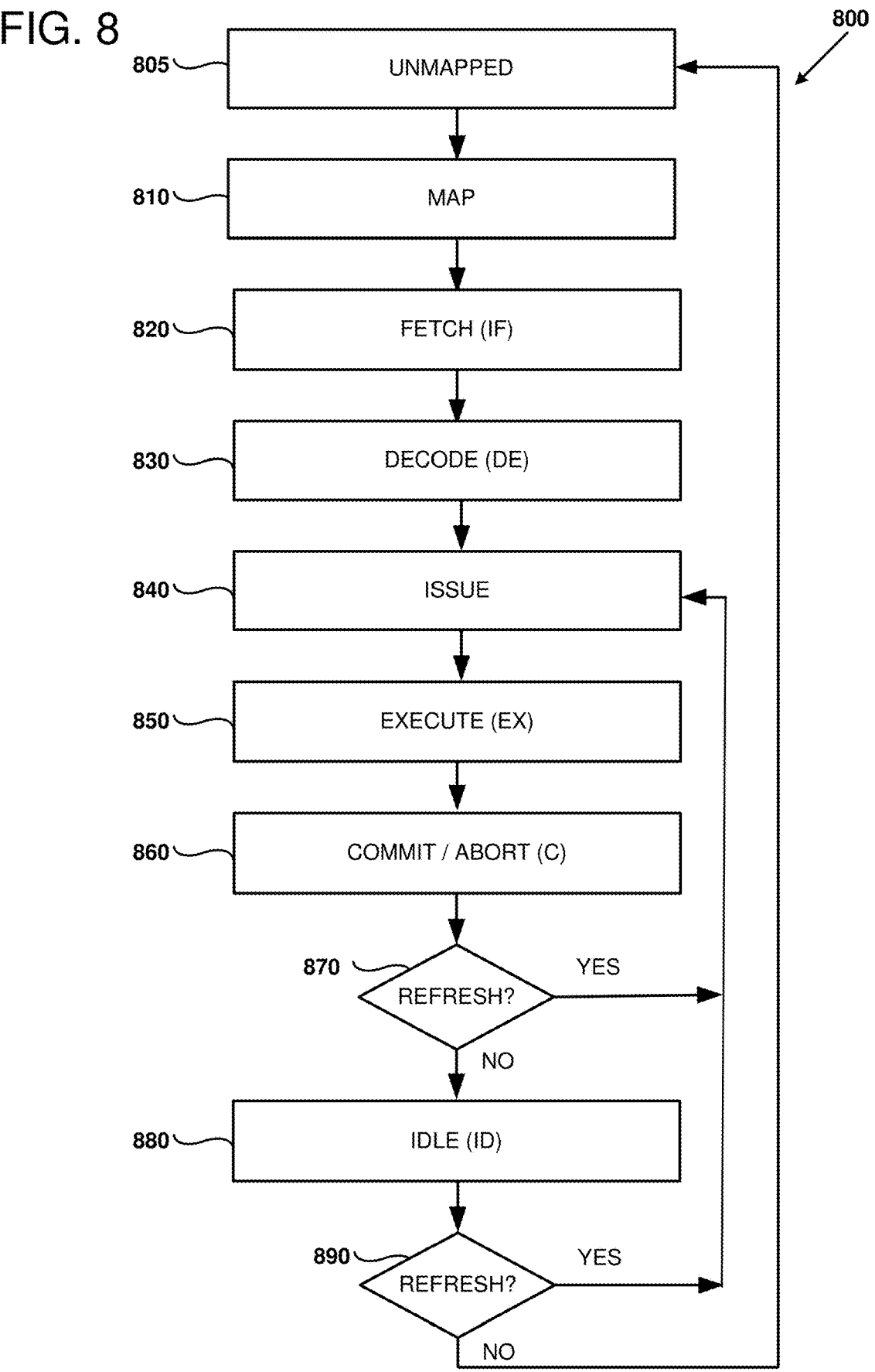
FIG. 8 is a flow chart illustrating an example of a progression of execution states of a processor core in a block-based processor, as can be used in certain examples of the disclosed technology.

FIG. 8 is a state diagram 800 illustrating number of states assigned to an instruction block as it is mapped, executed, and retired. For example, one or more of the states can be assigned during execution of an instruction according to one or more execution flags. It should be readily understood that the states shown in FIG. 8 are for one example of the disclosed technology, but that in other examples an instruction block may have additional or fewer states, as well as having different states than those depicted in the state diagram 800. At state 805, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 810, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 820.

When the instruction block is in the fetch state 820 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 830.

During the instruction decode state 830, various bits of the fetched instruction are decoded into signals that can be used by the processor core to control execution of the particular instruction, including generation of identifiers indicating relative ordering of memory access instructions. For example, the decoded instructions can be stored in one of the memory stores shown above, in FIG. 2. The decoding includes generating dependencies for the decoded instruction, operand information for the decoded instruction, and targets for the decoded instruction. Once at least one instruction of the instruction block has been decoded, the instruction block can proceed to issue state 840.

During the issue state 840, instruction dependencies are evaluated to determine if an instruction is ready for execution. For example, an instruction scheduler can monitor an instruction's source operands and predicate operand (for predicated instructions), which must be available before an instruction is ready to issue. For some encodings, certain instructions also must issue according to a specified ordering. For example, memory load store operations are ordered according to an LSID value encoded in each instruction. In some examples, more than one instruction is ready to issue simultaneously, and the instruction scheduler selects one of the ready to issue instructions to issue. Instructions can be identified using their IID to facilitate evaluation of instruction dependencies. Once at least one instruction of the instruction block has issued, source operands for the issued instruction(s) can be fetched (or sustained on a bypass path), and the instruction block can proceed to execution state 850.

During the execution state 850, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort state 860. In some examples, the control logic uses a write mask and/or a store mask for an instruction block to determine whether execution has proceeded sufficiently to commit the instruction block.

At the commit/abort state 860, the processor core control unit determines that operations performed by the instruction block can be completed. For example memory load store operations, register read/writes, branch instructions, and other instructions will definitely be performed according to the control flow of the instruction block. For conditional memory instructions, data will be written to memory, and a status indicator value that indicates success generated during the commit/abort state 860. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Regardless of whether the instruction block has committed or aborted, the instruction block goes to state 870 to determine whether the instruction block should be refreshed. If the instruction block is refreshed, the processor core re-executes the instruction block, typically using new data values, particularly the registers and memory updated by the just-committed execution of the block, and proceeds directly to the execute state 850. Thus, the time and energy spent in mapping, fetching, and decoding the instruction block can be avoided. Alternatively, if the instruction block is not to be refreshed, then the instruction block enters an idle state 880.

In the idle state 880, the processor core executing the instruction block can be idled by, for example, powering down hardware within the processor core, while maintaining at least a portion of the decoded instructions for the instruction block. At some point, the control unit determines 890 whether the idle instruction block on the processor core is to be refreshed or not. If the idle instruction block is to be refreshed, the instruction block can resume execution at execute state 850. Alternatively, if the instruction block is not to be refreshed, then the instruction block is unmapped and the processor core can be flushed and subsequently instruction blocks can be mapped to the flushed processor core.

While the state diagram 800 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

X. Example Block-Based Processor and Memory Configuration

Figure 9:
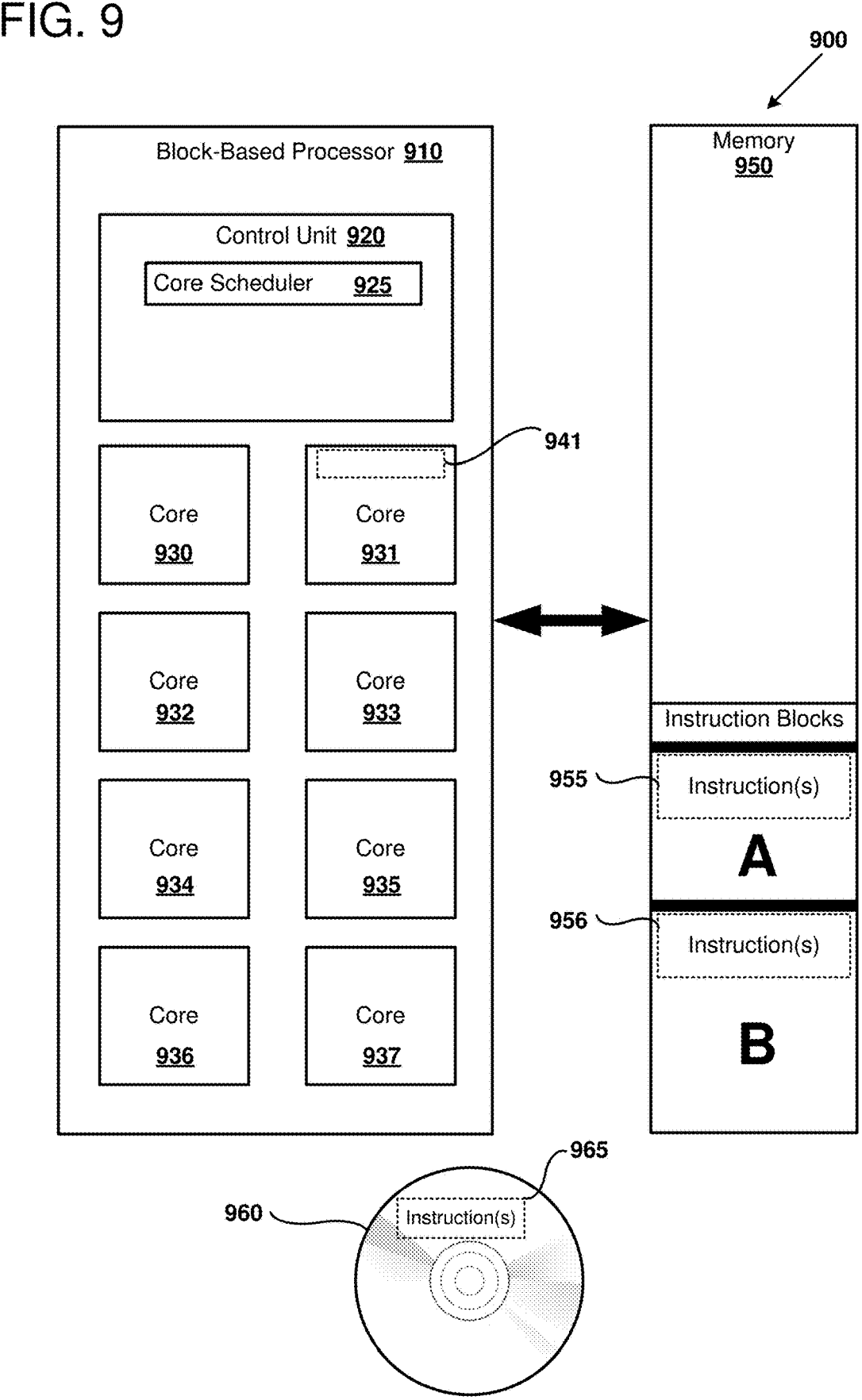
FIG. 9 is a block diagram illustrating an example configuration including a block-based processor and memory, as can be used in certain examples of the disclosed technology.

FIG. 9 is a diagram 900 illustrating an apparatus comprising a block-based processor 910, including a control unit 920 configured to execute instruction blocks including instructions for memory operations including memory synchronization and memory locks. The control unit includes a core scheduler 925 that controls allocation and de-allocation of cores for performing instruction processing, control of input data and output data between any of the cores, register files, memory interfaces and/or I/O interfaces. The control unit 920 can also include dedicated registers for performing certain memory operations.

The block-based processor 910 also includes one or more processor cores 930-937 that are configured to fetch and execute instruction blocks. Each of the cores includes an instruction scheduler (e.g., instruction scheduler 941) that controls the order in which instructions in an instruction block are fetched, decoded, issued, and executed. The illustrated block-based processor 910 has up to eight cores, but in other examples there could be 1, 2, 4, 64, 512, 1024, or other numbers of block-based processor cores. The block-based processor 910 is coupled to a memory 950 which includes a number of instruction blocks, including instruction blocks A and B, which include instructions (955 and 956, respectively) implementing disclosed memory operations, and to a computer-readable storage media disc 960 that stores instructions 965 for performing disclosed memory operations.

XI. Example Method of Operating a Block-Based Processor

Figure 10:
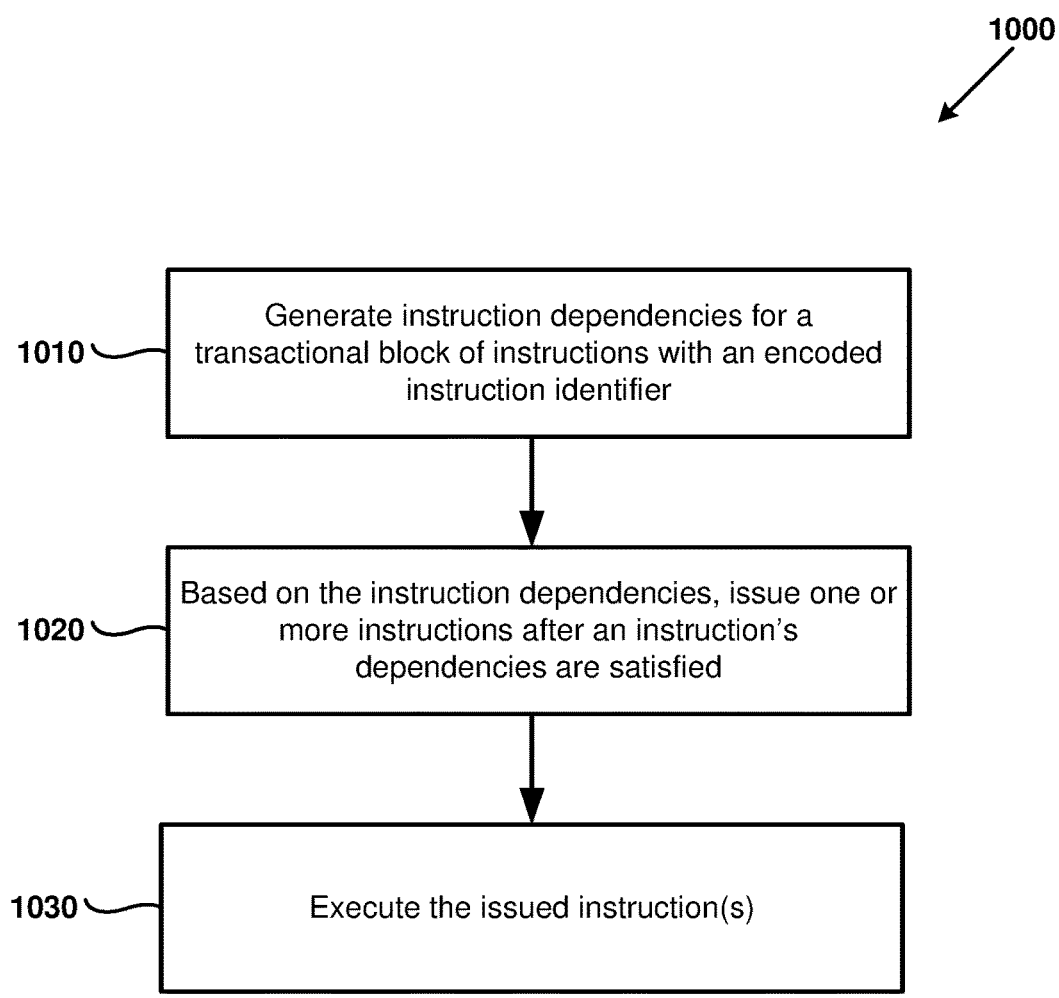
FIG. 10 is a flow chart illustrating an example method of issuing instructions having encoded instruction identifiers, as can be used in certain examples of the disclosed technology.

FIG. 10 is a flow chart 1000 that outlines an example method of operating a block-based processor as can be performed in certain examples of the disclosed technology. For example, a custom, or ASIC implementation of a block-based processor, or an FPGA implementation of a block-based processor such as those discussed above, can be used to perform the illustrated method.

At process block 1010, the structure dependencies for a transactional block of instructions are generated. Each of the instructions has an instruction identifier assigned, for example, an index of an instruction's relative position within an instruction block can be used as the instruction identifier. Instructions can be encoded with their respective target instructions using the instruction identifier. The processor will send a result generated by an instruction to the specified target instruction(s) as an input operand for the targeted instruction. In other examples, the instruction identifier can be encoded in a header or footer portion of the instruction block. The instructions dependencies can include, but are not limited to, input operands for the instruction, and ordering information for loads and stores to memory.

In some examples, dependencies are only generated for a portion of the transactional block of instructions. This includes cases where instructions are fetched, decoded, and executed before all of the instruction block has been fetched. The block-based processor need not wait for all of the instruction block to be decoded to begin operation. In some examples, the instruction is encoded with an instruction identifier that uniquely identifies the instruction in the transactional instruction block. For example, one way to encode the instruction identifier is by the relative position of the instruction within the instruction block. Other instructions can then target that particular instruction for sending data operands and predicates to, by designating the instruction ID where the instruction is located. For example, if an instruction is located at the fourth available memory address for an instruction within the instruction block, another instruction can target the instruction by specifying an instruction ID value of four. As will be readily understood to one of ordinary skill in the art, other techniques for encoding instruction identifiers can be used. However, it is important to note that the instruction identifier is encoded in a static fashion, which allows for easier tracking of instruction dependencies within the instruction block. This is in contrast to traditional CISC and RISC approaches where instructions do not identify each other, but instead use registers or main memory to pass values between instructions. Specific examples of instruction dependencies that can be generated for instructions include; whether the instructions received an operand on a broadcast channel, whether the instructions predicate is ready, whether the instruction's input operands are ready, whether the instruction should be inhibited (e.g., because the instruction has already issued). In some examples, the ready state can be further divided into decoded ready state, which can be initialized by the instruction decoder and remains static for subsequent instances of the instruction block, or an active ready state, which can be refreshed for each instance of executing the instruction block. Thus, the decoded ready state indicates whether the instruction ever requires each of the specific dependencies encoded, while the active ready state indicates whether the specified dependency has been satisfied for the particular instance of executing the instruction block in question. After the instruction dependencies have been generated, the method proceeds to process block 1020.

At process block 1020, based on the instruction dependencies generated at process block 1010, one or more instructions are signaled as being ready once the corresponding instruction's dependencies have been satisfied. For some instructions, for example a move-immediate instruction, the instruction's dependencies are immediately satisfied because the instruction does not require any. Thus, such instructions are ready to issue immediately, even before any register values or other dependencies have arrived at the instruction block. For other instructions, the instruction must wait for its appropriate dependencies to be generated and satisfied. A ready instruction then awaits being selected to be issued by the instruction scheduler. In some examples, its corresponding 'ready' bit is set. For a given instruction window, several instructions may be or become ready, while only one or a small number of such instructions may issue each cycle. An issued instruction starts execution immediately. In some examples, the ready instructions selected for issue and subsequent execution in the order in which they are arranged in the instruction block. In other examples, other schemes can be used to determine which ready instruction to execute in the event that there are more instructions available to issue than the resources of the processor core allow. For example, in a core that can execute two instructions concurrently, when three instructions are ready to issue, two can be selected to start execution and the third delayed until an execution slot is available.

At process block 1030, the next issued instruction is executed. For example, the functional units 250 and 265 in the pipeline detected of the microarchitecture of FIG. 2 can be used to execute the instruction. The instruction result can be stored in memory using the load-store queue 270, written to the register file 290, or sent back in the pipeline for execution by other instructions using the operand buffers 239 or a bypass mechanism to go directly to the execution pipeline registers 245. In this way, operands can be sent directly for use by instructions that are dependent on the currently executing instruction.

XII. Example Method of Operating a Block-Based Processor with Refresh

Figure 11:
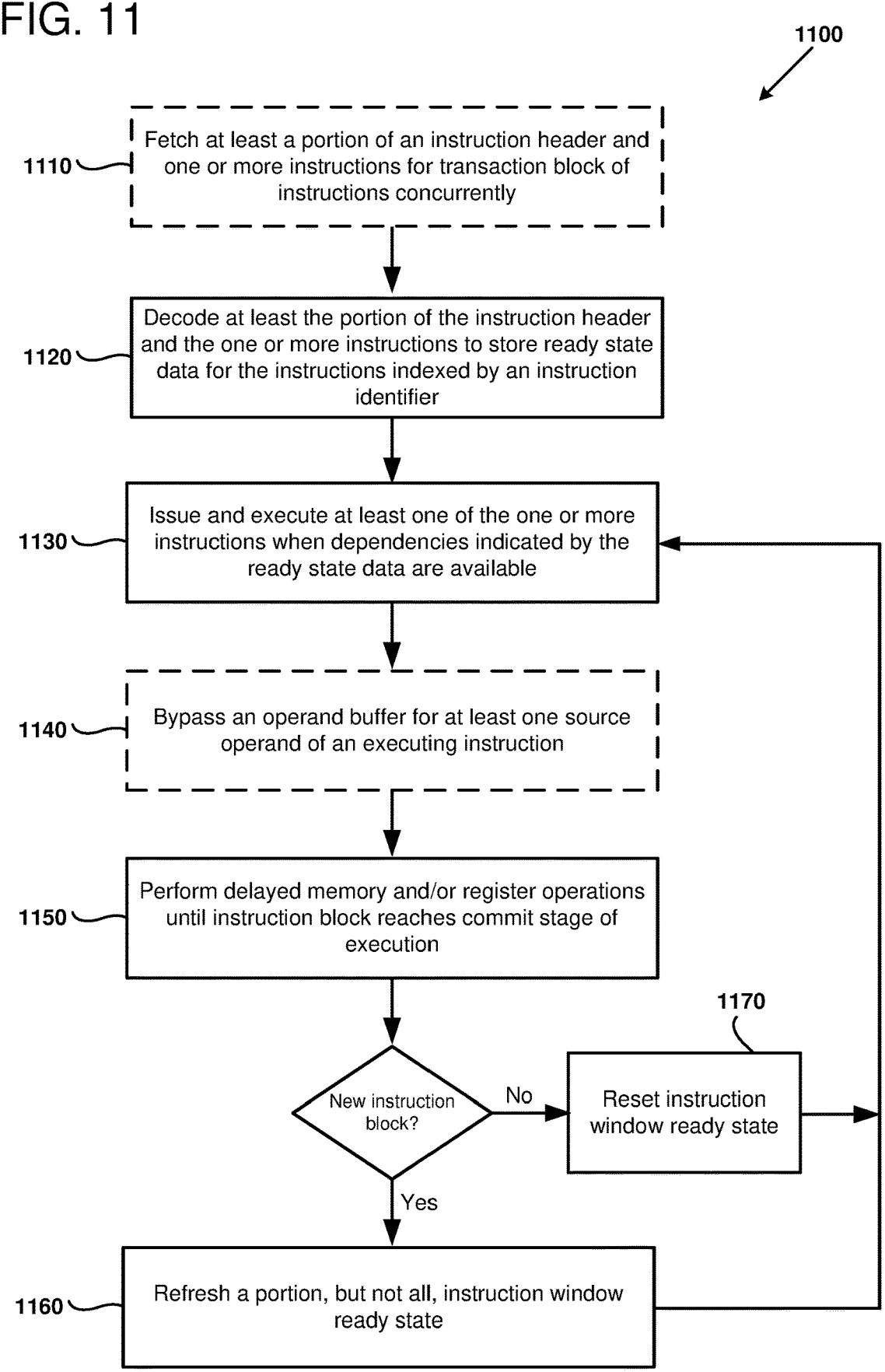
FIG. 11 is a flow chart outlining an example method of issuing and executing instructions when the dependencies indicated by ready state data are available, as can be performed in certain examples of the disclosed technology.

FIG. 11 is a flowchart 1100 outlining an example of executing a block of instructions as can be performed in certain examples of the disclosed technology. For example, the block-based processor described above regarding FIG. 2, including implementations that use the microarchitecture discussed above in FIG. 2, can be used to implement certain examples of the method. In some examples, the method can be performed using a custom or application-specific integrated circuit (ASIC), while in other examples, reconfigurable logic circuits such as FPGAs can be used. At process block 1110, an instruction header and one or more instructions for a transactional block of instructions can be fetched concurrently. In some examples, only a portion of the instruction header is fetched in a particular clock cycle. In certain FPGA examples, a multi-read port block RAM allows for concurrent fetching of the instruction header and a block instruction. This can be advantageous in certain applications as it allows for concurrent instruction header decoding while instruction block instructions with no dependencies can immediately be issued and start execution. In other examples of the method, only a single word of memory is fetched at a time.

At process block 1120, the instruction header portion is decoded. The instruction fetched at process block 1110 is also decoded. The instruction decoder generates and stores ready-state data for the instruction in a memory that can be indexed using an instruction identifier associated with the instruction. In some examples, the instruction identifier for a given instruction is based on the relative position of the instruction within the instruction block, and other instructions in the instruction block reference that instruction based on the instruction's identifier. The decoded ready-state data can be stored in a RAM that is composed of distributed RAM that is mapped onto LUTs of a FPGA. In other examples, other forms of RAM, or latches, or flip-flops, are used to store the decoded instruction data, including the decoded ready-state data that is used by the instruction scheduler. For example, the ready-state data can be stored in a memory coupled to the instruction scheduler 235 of FIG. 2 while control information for controlling execution of the micro-architectural pipeline can be stored in the decoded instruction store 236. The instruction scheduler 235 can also be used to control operand reads from the operand buffers 239.

At process block 1130, the processor issues and executes at least one of the instructions when its dependencies, as indicated by the ready-state data, are available. For example, a number of bits can be stored in an FPGA distributed LUT RAM, or block RAM, and when all of the bits match a designated pattern, the instruction is issued. Because only a limited number of instructions can execute using the execution pipeline in a given clock cycle, if more than the number of supported instructions becomes ready to issue, then certain instructions must wait. Techniques such as using a "ready to issue" bit mask plus a priority encoder can be used to determine which instructions should be executed next.

At process block 1140, the processor uses a bypass mechanism in order to bypass its operand buffers for at least one source of operand for an executing instruction. By bypassing the operand buffers (e.g., operand buffers 239), the pipeline can avoid a delay of one clock cycle by sending the next instruction's data directly to the pipeline registers 245. In other examples, the block-based processor does not use such a bypass mechanism. Use of the bypass mechanism can also avoid limitations with the number of read ports available on the operand buffers 239. For example, in some microarchitectures, the number of read ports, or the types of operands that can be written to the operand buffer in the same clock cycle may be limited. For example, the operand buffers may be only able to accept one left operand and one right operand per clock cycle. By also allowing for the use of bypass, when there are more than one instruction executing, pipeline stall can be avoided by sending operands for the very next instruction directly to the pipeline registers 245 while operands generated by another instruction concurrently are safely stored in the operand buffer 239.

At process block 1150, the instruction block reaches the commit stage of execution and performs any memory and/or register operations that were delayed until the instruction block reaches the commit stage. For example, the load store queue 270 or shadow registers within the register file 290 can store data until it is actually determined that it will be written to by the executing instruction block. This maintains coherency of the machine state in cases where, for example, multiple instructions write to the same memory address, or a memory or register operation does not occur due to speculative execution of the instruction block. The method then proceeds to process the next instruction block in the program. If the same instruction block is to be executed again, for example in a program loop, then the method proceeds to process block 1160. In some examples, an instruction block may be all or partially decoded and available, in which case the method may also proceed to process block 1160 in order to refresh the instruction window of the instruction block. In other examples, for example where the instruction block is not yet fully decoded, or where the instruction block is newly executed, the method proceeds to process block 1170.

At process block 1160, the instruction window ready state is refreshed, for example by resetting the active ready state data for the instruction block, but reusing the previously decoded ready state data for the instruction block. Thus, certain dependencies can be determined, and execution allowed to proceed, without re-decoding and reusing some of the work from the previous execution of the instruction block. At process block 1170, the entire instruction window ready state is reset. Regardless of whether the refreshed or reset, the method proceeds to process block 1130 in order to issue and execute additional instructions. In the event that additional instruction information must be fetched and decoded, the method can alternatively proceed to process block 1110 or process block 1120 as is suitable for executing the instruction block.

XIII. Example Method of Configuring a Reconfigurable Logic Device

Figure 12:
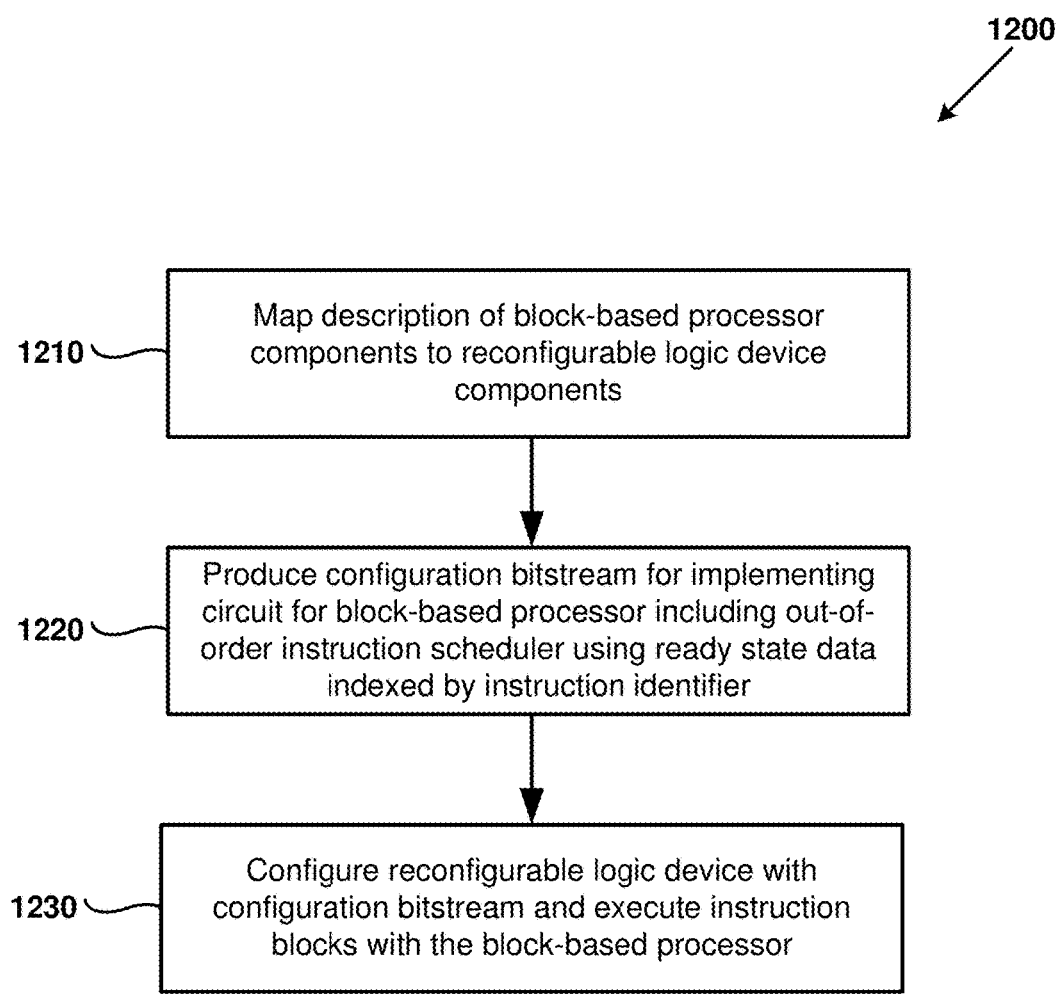
FIG. 12 is a flow chart outlining an example method of producing a configuration bit-stream for implementing a block-based processor, as can be performed in certain examples of the disclosed technology.

FIG. 12 is a flow chart 1200 outlining an example method of configuring a reconfigurable logic device, as can be performed in certain examples of the disclosed technology. For example, the FPGA discussed above regarding FIG. 3 can be configured to implement the block-based processor of FIG. 1 using the example microarchitecture discussed above regarding FIG. 2.

At process block 1210, a description of block-based processor components is mapped to reconfigure logic device components of the FPGA. For example, a process designer can specify a description of the block-based processor in the hardware description language, such as SystemVerilog, SystemC, Verilog, or any other suitable combination of hardware description languages. In some examples, a description written in a traditional programming language such as C or C++ are used to describe at least a portion of the block-based processor. The description of the block-based processor can include any of the novel components discussed above. In some examples, the designer can specify specific FPGA cells to be targeted by elements of the processor microarchitecture. For example, the designer may specify that the instruction cache and/or the data cache are implemented using block RAM resources of the FPGA. In some examples, the programmer can use available macros provided by the FPGA vendor to implement FIFO buffers, shift registers, and other components using economical mappings for that FPGA.

At process block 1220, a configuration bitstream is produced for implementing a circuit for the block-based processor that includes an out-of-order instruction scheduler that uses ready state data indexed by an instruction identifier. For example, a description of a block-based processor expressed in a hardware description language can be compiled to generate a netlist, and the netlist in turn used to generate a bitstream file. The signals indicated in the bitstream file can be applied to the configuration interface of an FPGA in order to configure the FPGA to perform functions for implementing a block-based processor according to the disclosed techniques.

At process block 1230, the reconfigurable logic device is configured using the bitstream generated at process block 1220. For example, some FPGAs have a readback port that is used to serially stream data into configuration memory of the FPGA, thereby configuring the FPGA. In some examples, configuration memory of the FPGA is addressed through a parallel or other addressable port. In some examples, a configurable logic device having a structure similar to an FPGA can be configured once, but not reconfigured. In other examples, the FPGA can be electrically erased and rewritten to in order to provide a new configuration. In some examples, the FPGA is re-configured whenever the integrated circuit is re-powered, while in other examples, the FGPA configuration maintains state across repeated power cycles.

XIV. Example Computing Environment

Figure 13:
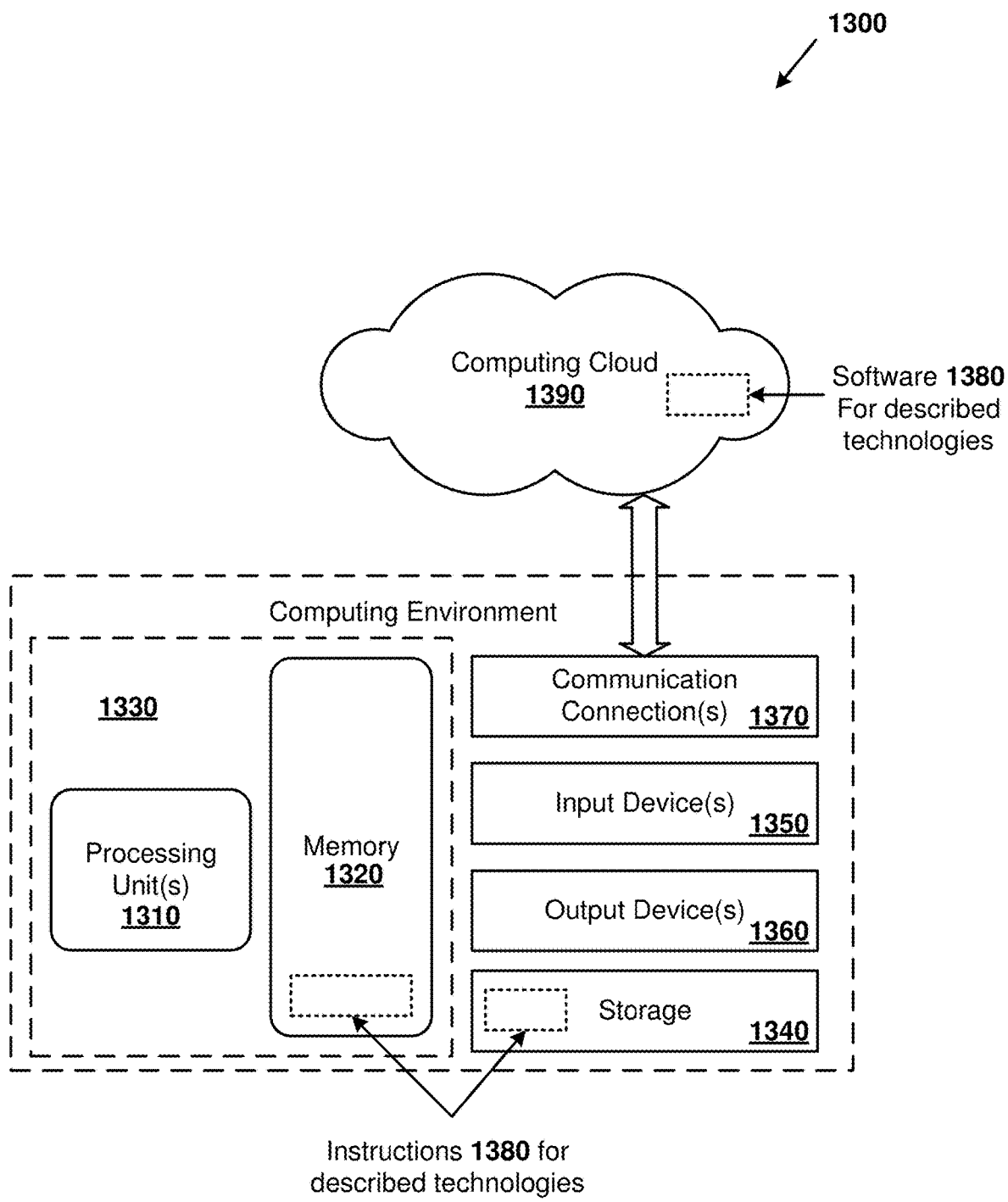
FIG. 13 is a block diagram illustrating a suitable computing environment for implementing certain embodiments of the disclosed technology.

FIG. 13 illustrates a generalized example of a suitable computing environment 1300 in which described embodiments, techniques, and technologies, including configuring a block-based processor, can be implemented. For example, the computing environment 1300 can implement disclosed techniques for configuring a processor to implement disclosed block-based processor architectures and microarchitectures, and/or compile code into computer-executable instructions and/or configuration bitstreams for performing such operations, as described herein.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 13, the computing environment 1300 includes at least one block-based processing unit 1310 and memory 1320. In FIG. 13, this most basic configuration 1330 is included within a dashed line. The block-based processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input device(s) 1350, one or more output device(s) 1360, and one or more communication connection(s) 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, disclosed compilers and/or block-based-processor servers are located in the computing environment, or the disclosed compilers can be executed on servers located in the computing cloud 1390. In some examples, the disclosed compilers execute on traditional central processing units (e.g., RISC or CISC processors).

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

XV. Additional Examples of the Disclosed Technology

Additional examples of the disclosed subject matter are discussed herein in accordance with the examples discussed above. For example, aspects of the block-based processors discussed above regarding FIGS. 1, 2, and 9 can be used to implement these additional examples, including FPGAs such as those discussed above regarding FIGS. 3 and 4.

In certain examples of the disclosed technology, all or a portion of a block-based processor are implemented by configuring an FPGA to include structures for executing programs expressed in the block-based processor ISA. In some examples, the processor is implemented in an embedded device such as for deploying in a network of Internet of Things (IoT). In some examples, structures such as caches, and storage used in the instruction scheduler, the load store queue and/or the register file are implemented in memories having a single write port or a single read port. In other examples, one or more of these structures are implemented in memories having multiple read and/or write ports. In some examples, an instruction block header, and one or more instructions of the instruction block can be fetched from memory and/or the instruction cache, concurrently. In some examples, a bypass mechanism allows for operations generated from the execution portion of the microarchitecture pipeline to bypass operands, thereby allowing for the back-to-back issue of instructions having a shared or chained dependencies. In some examples, the bypass mechanism allows for the avoidance of pipeline stall when there are more operands generated during an execution clock cycle than write ports on the instruction window operand buffer.

In some examples, the scheduler can use decoded or previously decoded instruction dependencies to wake up and issue instructions before they have been fetched. In some examples, storage for the instruction scheduler can be split in to two or more portions in order to map the storage to two or more physical storage units of an FPGA. In some examples, the instruction scheduler includes a parallel scheduler. In other examples, the instruction scheduler includes one or more event queues and one or more instruction queues. In some examples, the scheduler is configured to refresh some but not all of an instructions ready state upon re-executing an instruction block.

In some examples of the disclosed technology, an apparatus includes a block-based processor, and the block-based processor includes an instruction decoder configured to generate decoded ready dependencies for at least a portion of a transactional block of instructions, each of the instructions being associated with a different instruction identifier encoded in the transactional block, and an instruction scheduler configured to issue an instruction from the transactional block of instructions out of program order. The instruction scheduler can issue the instruction based on determining that the decoded ready dependencies for the instruction are satisfied. The determining can include accessing storage storing the decoded ready dependencies using the respective instruction identifier encoded in the transactional block of instructions.

In some examples the determining includes using an instruction identifier signaled by an executed instruction to generate an index used to access the storage. In some examples, the processor further includes an instruction fetch unit, the instruction fetch unit being configured to fetch at least a portion of a header for the transactional block of instructions and to fetch at least a portion of an instruction of the transactional block of instructions concurrently. In some examples, the instruction fetch unit comprises a first block memory that stores the fetched header and a second block memory that stores the fetched instruction. In some examples, the first block memory can store the fetched header, fetched instructions, or a mix of header and instructions. In some examples, the block-based processor is a soft core processor implemented with a configurable logic device. In some examples, the block-based processor is configured to select a next instruction of the block of instructions to execute with a priority encoder and based on the instruction identifier encoded for the next instruction. In some examples, this includes using a ready-to-issue bit mask.

In some examples, the instruction scheduler is coupled to a data operand buffer storing data generated for execution by the instructions in a subsequent clock cycle. In some examples, the processor includes bypass logic that allows data operands to be forwarded for execution by an instruction in the immediately subsequent clock cycle following the current execution clock cycle for the instruction, allowing the data operand to be forwarded without storing the data operand in the data operand buffer. In some examples, the data operand buffer is configured to store operand data for not more than one instruction per clock cycle, and the processor further includes bypass logic that allows a data operand for a different instruction to be forwarded to an execution unit of the processor in the same clock cycle as different data operand is stored in the data operand buffer.

In some examples of the disclosed technology, a reconfigurable logic device (such as a re-programmable or once-programmable FPGA) is configured to execute a block-based processor instruction set. The reconfigurable logic device is configured to execute the instructions using a plurality of lookup-tables (LUTs), an instruction cache configured to receive instructions from an instruction block fetched by the processor from a memory coupled to the reconfigurable logic device, an instruction scheduler configured to store ready state data indexed by an instruction identifier encoded in an instruction block and being further configured to issue instructions when the ready state data indicates that all dependencies for an instruction are satisfied, one or more execution units configured to perform operations specified by issued instructions, a data cache configured to store data read from and/or written to the memory by executing instructions using the execution units, and a register file configured to store data specified by register operands of the instructions. The data cache can be configured to delay completing memory operations until the instruction block reaches a commit stage of execution.

In some examples, the instruction cache and/or the data cache are implemented with block random access memory (RAM) resources of the reconfigurable logic device. In some examples, distributed RAM or LUT RAM are used to implement the instruction cache and/or the data cache.

In some examples, the instruction scheduler and/or the register file are implemented with random access memory (RAM) formed using a portion of the plurality of LUTs. In some examples, the instruction scheduler and/or the register file are implemented with block RAM. In some examples, the LUTs are formed from static random access memory (RAM) cells coupled to one or more multiplexers.

In some examples of the disclosed processor, the instruction scheduler is coupled to a decoded instruction word memory configured to store decoded instruction control data for at least a portion of the received instructions and a plurality of one or more operand buffers configured to store operand data for executing the received instructions. In some examples, the reconfigurable logic device is further configured to execute a subsequent instance of an instruction block by refreshing and re-executing the instruction block. In some examples, the ready state data includes decoded ready state information, which is not cleared upon the refreshing, and active ready state data, which is cleared upon the refreshing.

In some examples, the scheduler is configured to reuse at least a portion of the stored ready state data for an instruction for a subsequent instance of executing the instruction block, and the processor is configured to not re-fetch and to not re-decode the instruction for executing the subsequent instance. In some examples, the instruction scheduler is configured to determine that all of an instruction's dependencies are satisfied by comparing the stored ready state data to one or more signals generated by executing another instruction block.

In some examples of the disclosed technology, a method of forming a block-based processor with one or more configurable logic devices includes producing a configuration bitstream comprising configuration information for implementing a circuit for the block-based processor with the configurable logic devices, and the circuit for the block-based processor, once the configurable logic devices have been programmed using the configuration bitstream, includes an out-of-order instruction scheduler configured to issue instructions based on ready state data stored in a memory indexed by an instruction identifier uniquely identifying each respective instruction of a transactional instruction block.

In some examples, the method of forming a block-based processor includes mapping a description of an instruction cache and/or a data cache to block RAM hardware implemented with the configurable logic devices. In some examples, the method includes mapping a description of at least one of the components to a RAM implemented using a plurality of LUTs. In some examples, the method includes applying the configuration bitstream to a configuration port of an integrated circuit comprising the configurable logic devices to program the devices. In some examples, the method includes mapping a hardware description language specification of the block-based processor to a netlist including a description of hardware elements to be implemented with the configurable logic devices, and the resulting the netlist is used to produce the configuration bitstream. In some examples, the method includes mapping a hardware description language specification of a computing system to the configuration bitstream by combining the hardware description specification with a hard or soft macro description of the block-based processor. In some examples, the method includes storing the configuration bitstream in a computer-readable storage device or memory.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising:
an instruction decoder configured to generate decoded ready dependencies for at least a portion of a group of instructions fetched from a memory, each instruction of the group of instructions being associated with a different respective instruction identifier indicating that instruction's relative position within the group of instructions in the memory; and
an instruction scheduler configured to issue a first instruction from the group of instructions out of program order, wherein:
the first instruction is issued based on determining that the decoded ready dependencies for the first instruction are satisfied, and
the determining comprises accessing storage storing the decoded ready dependencies using the first instruction's respective instruction identifier encoded within one instruction of the group of instructions,
wherein the determining comprises using an instruction identifier encoded within and signaled by an executed instruction to generate an index used to access the storage, wherein the index is generated in response to execution of the executed instruction.

2. The apparatus of claim 1, wherein the apparatus further comprises an instruction fetch unit, the instruction fetch unit being configured to fetch at least a portion of a header for the group of instructions and to fetch at least a portion of an instruction of the group of instructions concurrently.

3. The apparatus of claim 2, wherein the instruction fetch unit comprises a first block memory that stores at least the fetched portion of the header and a second block memory that stores at least the fetched portion of the instruction.

4. The apparatus of claim 1, wherein the apparatus is a soft core processor implemented with a configurable logic device.

5. The apparatus of claim 1, wherein the apparatus is configured to select a next instruction of the group of instructions to execute with a priority encoder and based on the instruction identifier encoded for the next instruction.

6. The apparatus of claim 1, wherein the instruction scheduler is coupled to a data operand buffer, the data operand buffer storing data generated for execution by the instructions in a subsequent clock cycle.

7. The apparatus of claim 6, further comprising a bypass logic circuit that allows data operands to be forwarded for execution by an instruction in the immediately subsequent clock cycle, the bypass logic circuit allowing the data operands to be forwarded without storing the data operands in the data operand buffer.

8. The apparatus of claim 6, wherein the data operand buffer is configured to store operand data for not more than one instruction per clock cycle, the apparatus further comprising:
a bypass logic circuit that allows a data operand for a different instruction to be forwarded to an execution unit in the same clock cycle as a different data operand is stored in the data operand buffer.

9. A field programmable gate array (FPGA) comprising:
a processor, comprising:
a first memory implemented using a plurality of multi-input lookup-tables (LUTs) in the FPGA;
an instruction cache configured to receive instructions fetched from a second memory, a given instruction of the received instructions comprising first and second instruction identifiers encoded in the given instruction, the first instruction identifier indicating the given instruction's relative position within a group of instructions in the second memory, and the second instruction identifier designating a target instruction other than the given instruction, to receive a result generated by executing the given instruction; and
an instruction scheduler configured to store ready state data in the first memory indexed by an instruction identifier of a corresponding instruction, the stored ready state data indicating state of the corresponding instruction's predicate operands and/or data operands, the instruction scheduler being further configured to issue the corresponding instruction when the stored ready state data indicates that all operand dependencies for the corresponding instruction are satisfied.

10. The FPGA of claim 9, wherein the instruction cache is implemented with block random access memory (RAM) resources of the FPGA.

11. The FPGA of claim 9, wherein the instruction scheduler is implemented with random access memory (RAM) formed using a portion of the plurality of LUTs.

12. The FPGA of claim 11, wherein the LUTs are formed from static random access memory (RAM) cells coupled to one or more multiplexers.

13. The FPGA of claim 9, wherein the instruction scheduler is coupled to:
a decoded instruction word memory configured to store decoded instruction control data for at least a portion of the received instructions; and
a plurality of operand buffers configured to store operand data for executing the received instructions.

14. The FPGA of claim 9, wherein the FPGA is further configured to execute a subsequent instance of the given instruction by refreshing and re-executing the given instruction, and wherein the ready state data comprises decoded ready state information, which is not cleared upon the refreshing, and active ready state data that is cleared upon the refreshing.

15. The FPGA of claim 9, wherein the instruction scheduler is configured to reuse at least a portion of the stored ready state data for a second instruction distinct from the given instruction for a subsequent instance of executing the received instructions, and wherein the FPGA is configured to not re-fetch and to not re-decode the second instruction for executing the subsequent instance.

16. The FPGA of claim 9, wherein the instruction scheduler is configured to determine that all of an instruction's dependencies are satisfied by comparing the stored ready state data to one or more signals generated by executing another instruction.

17. The FPGA of claim 9, wherein at least one of the received instructions is encoded with an instruction identifier that indicates a target instruction that receives a result generated by executing the at least one of the received instructions.

18. A method of forming a processor with configurable logic devices, the method comprising:
producing a configuration bitstream comprising configuration information for implementing a circuit for the processor with the configurable logic devices, the circuit for the processor comprising:
an out-of-order instruction scheduler configured to issue a target instruction based on operand ready state data stored in a memory indexed by an instruction identifier designating the target instruction that receives a result consumed by the target instruction when a source instruction that produces at least one operand indicated by the operand ready state data is executed, the instruction identifier being encoded in the source instruction,
the out-of-order instruction scheduler being further configured to use an instruction identifier from an executed instruction to generate an index for accessing ready dependencies of another instruction, wherein the index is generated in response to pipelined execution of the source instruction.

19. The method of claim 18, further comprising mapping a description of at least one or more of the following to block random access memory (RAM) hardware implemented with the configurable logic devices: an instruction cache or a data cache.

20. The method of claim 18, further comprising mapping a hardware description language specification to a netlist, the netlist comprising a description of hardware elements to be implemented with the configurable logic devices, wherein the netlist is used to produce the configuration bitstream.

* * * * *